Figure 1:
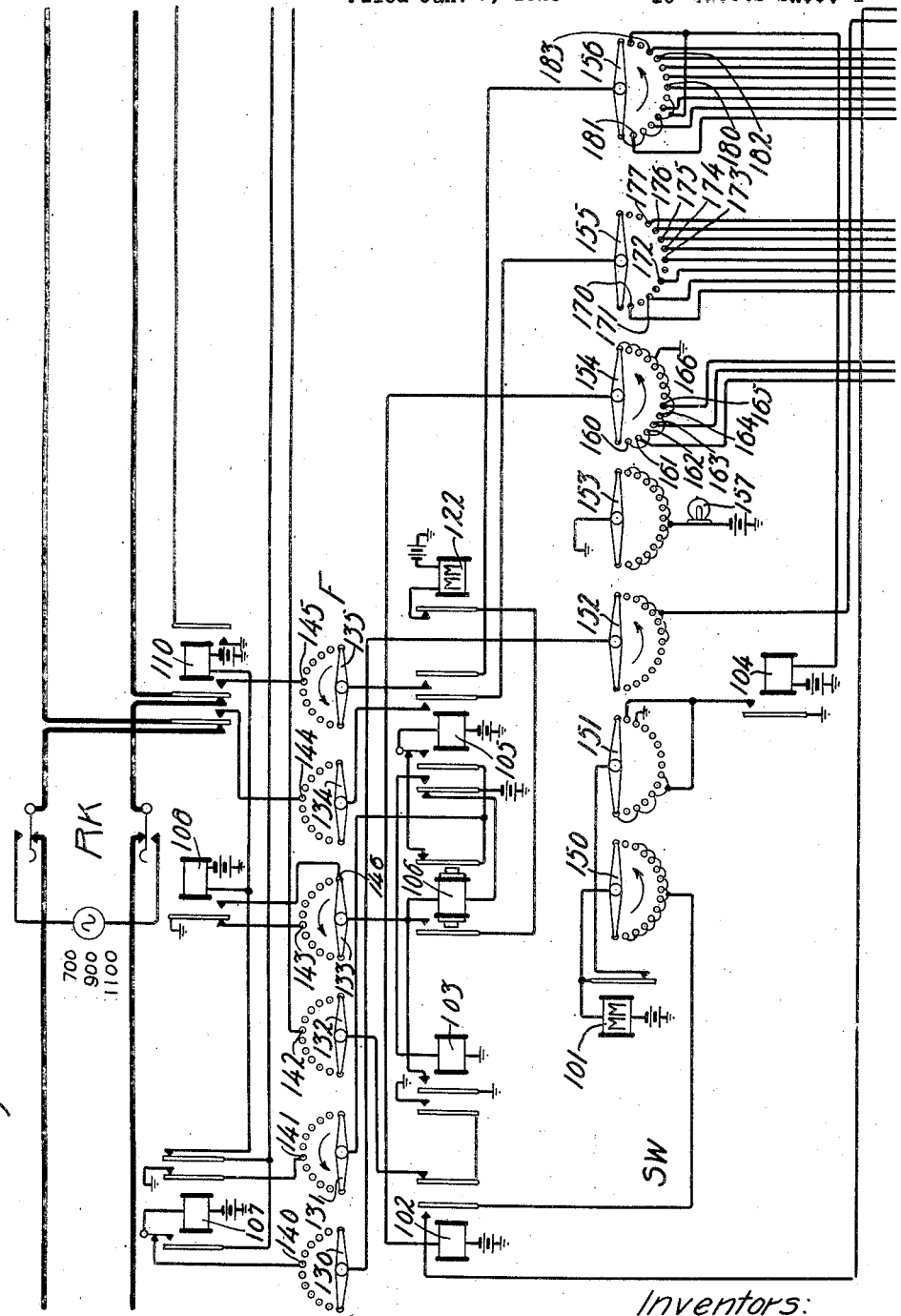

March 10, 1925. 1,528,806

R. S. WILBUR ET AL

TELEPHONE EXCHANGE SYSTEM

Filed Jan. 3, 1921 10 Sheets-Sheet 1

Inventors:
Ray S. Wilbur,
Charles White,
by E. R. Nowlan Att'y

March 10, 1925.  R. S. WILBUR ET AL  1,528,806
TELEPHONE EXCHANGE SYSTEM
Filed Jan. 3, 1921   10 Sheets-Sheet 2
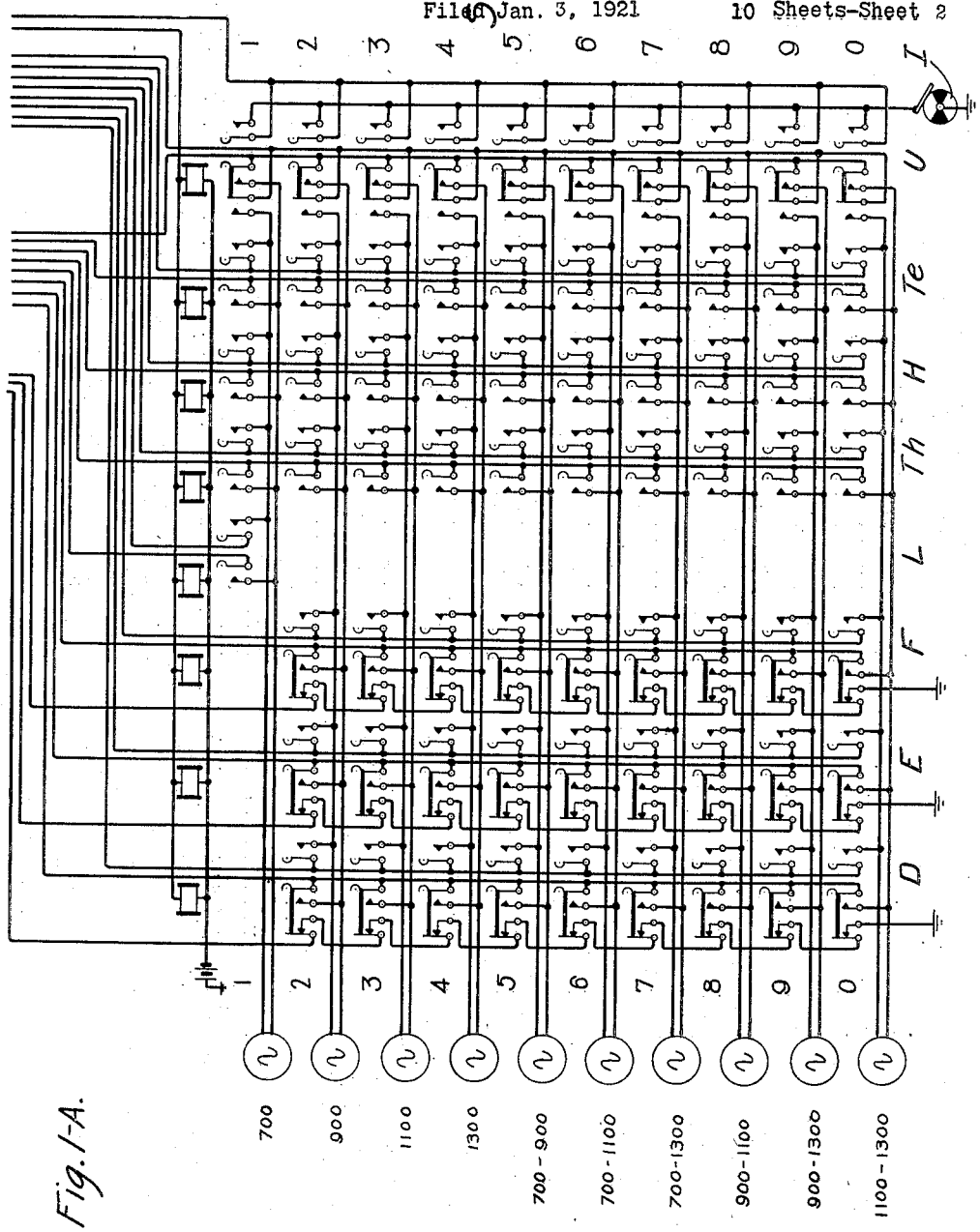
Fig.1-A.
Inventors:
Ray S. Wilbur.
Charles White.
by  E. R. Nowlan Att'y.

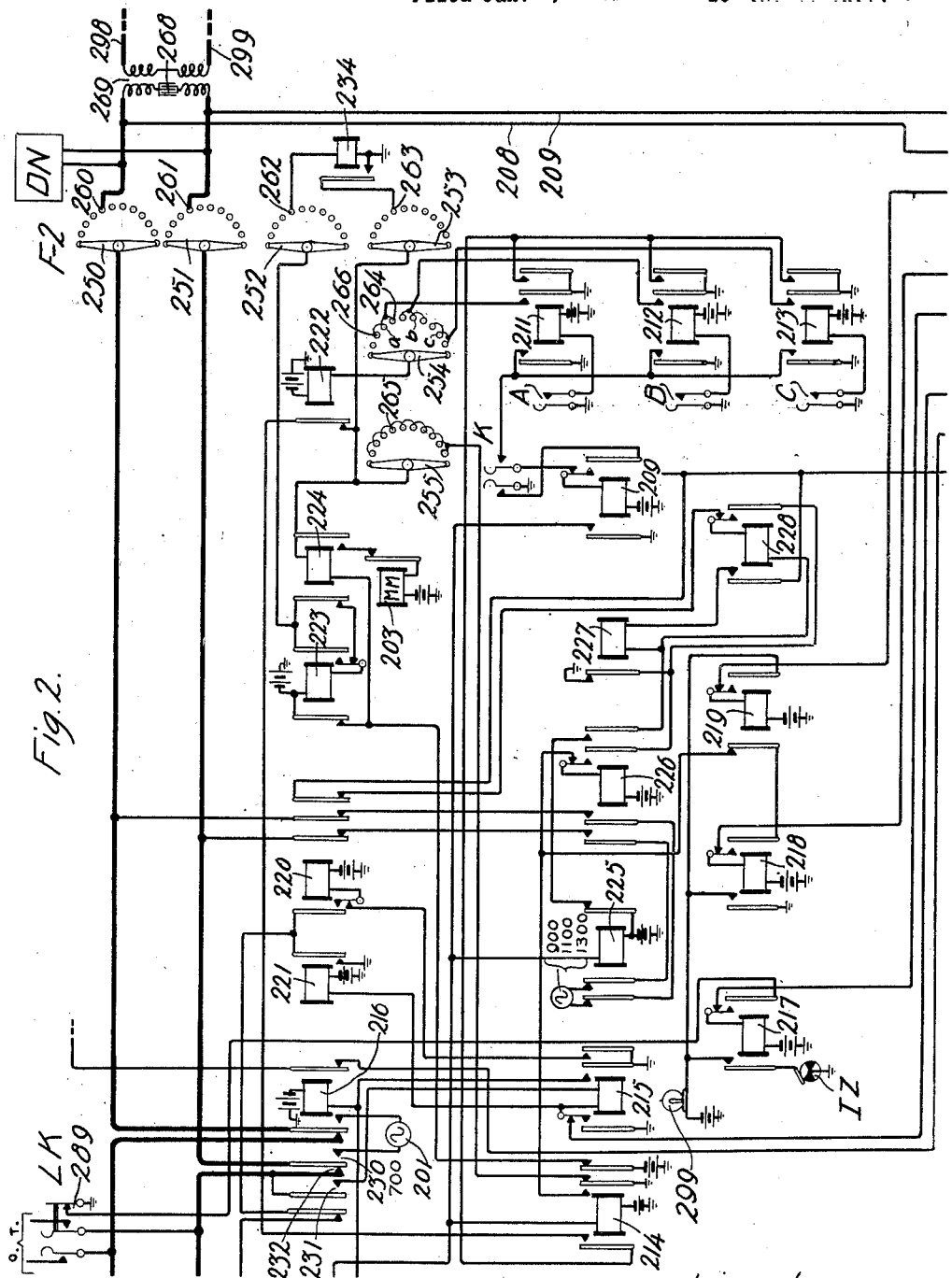

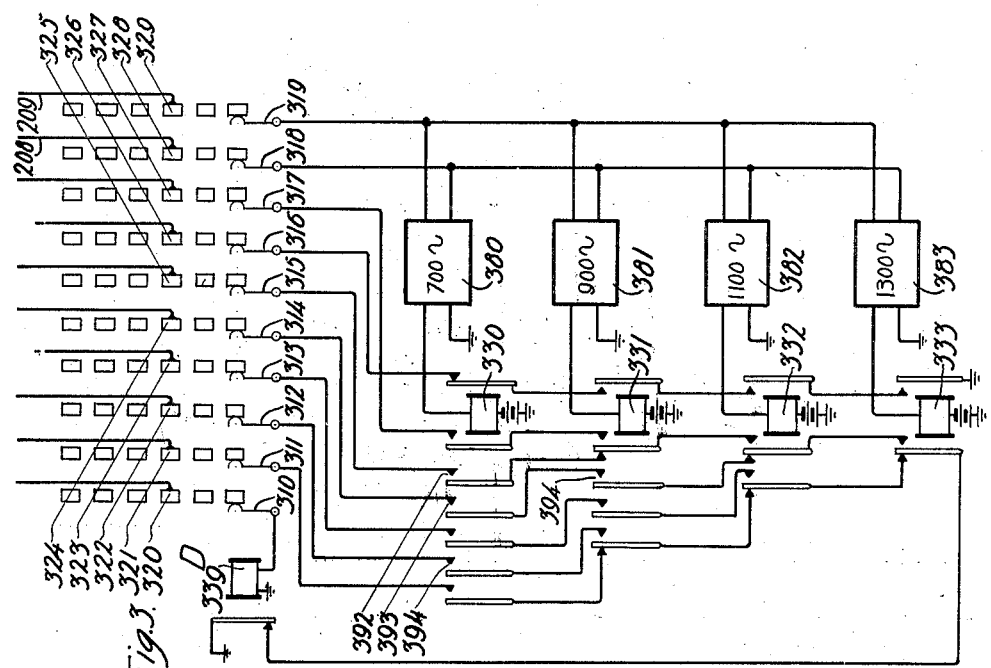

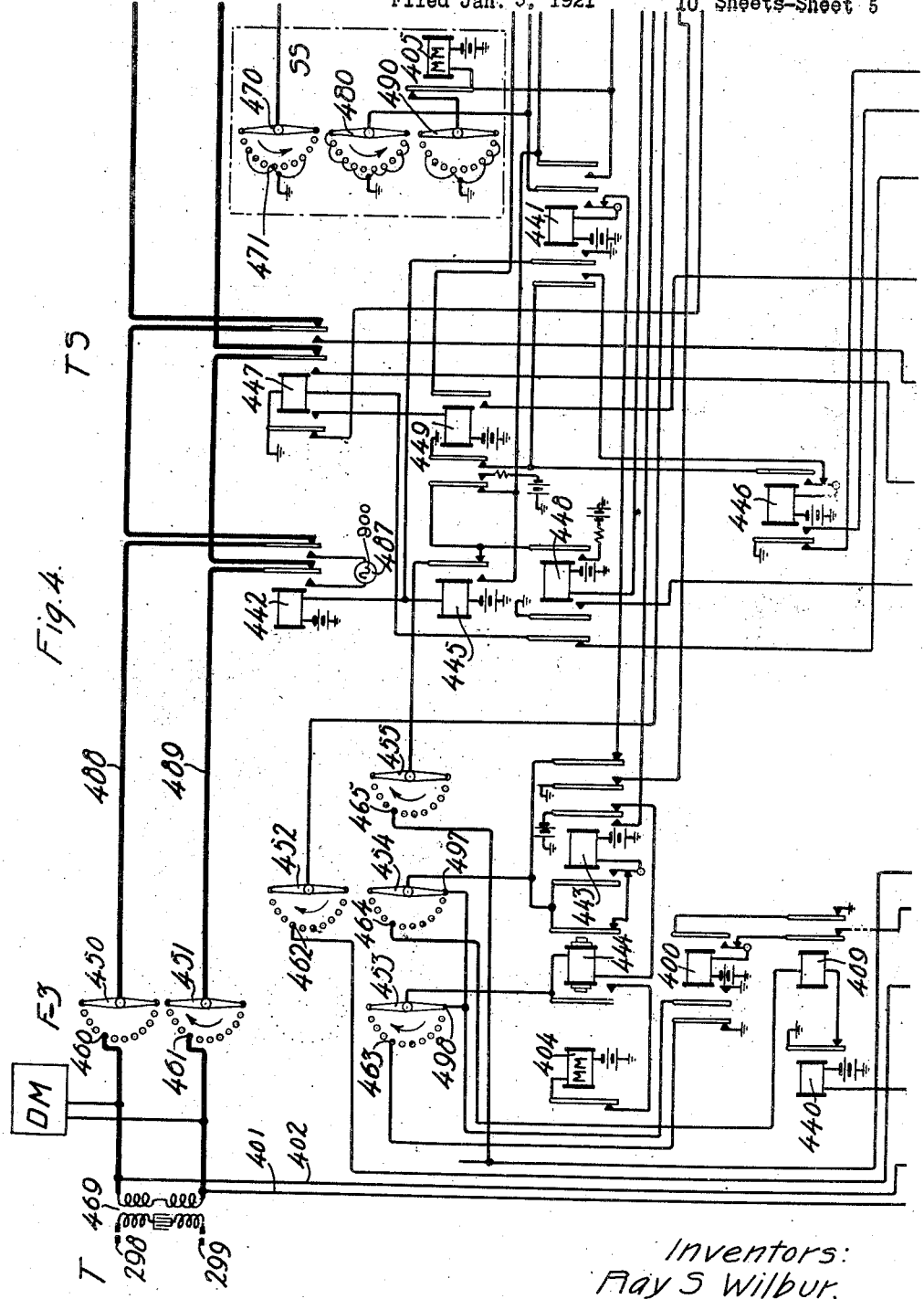

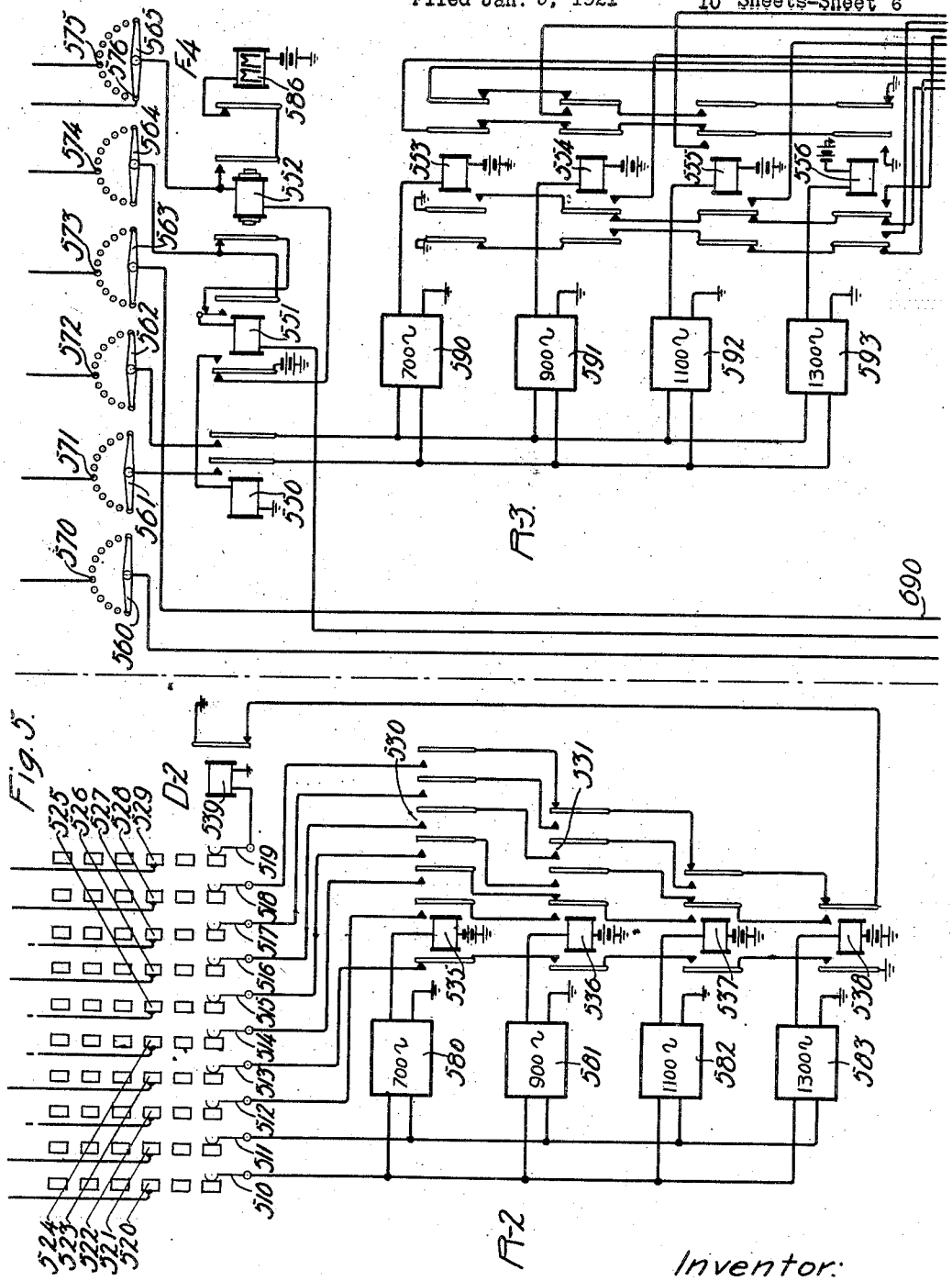

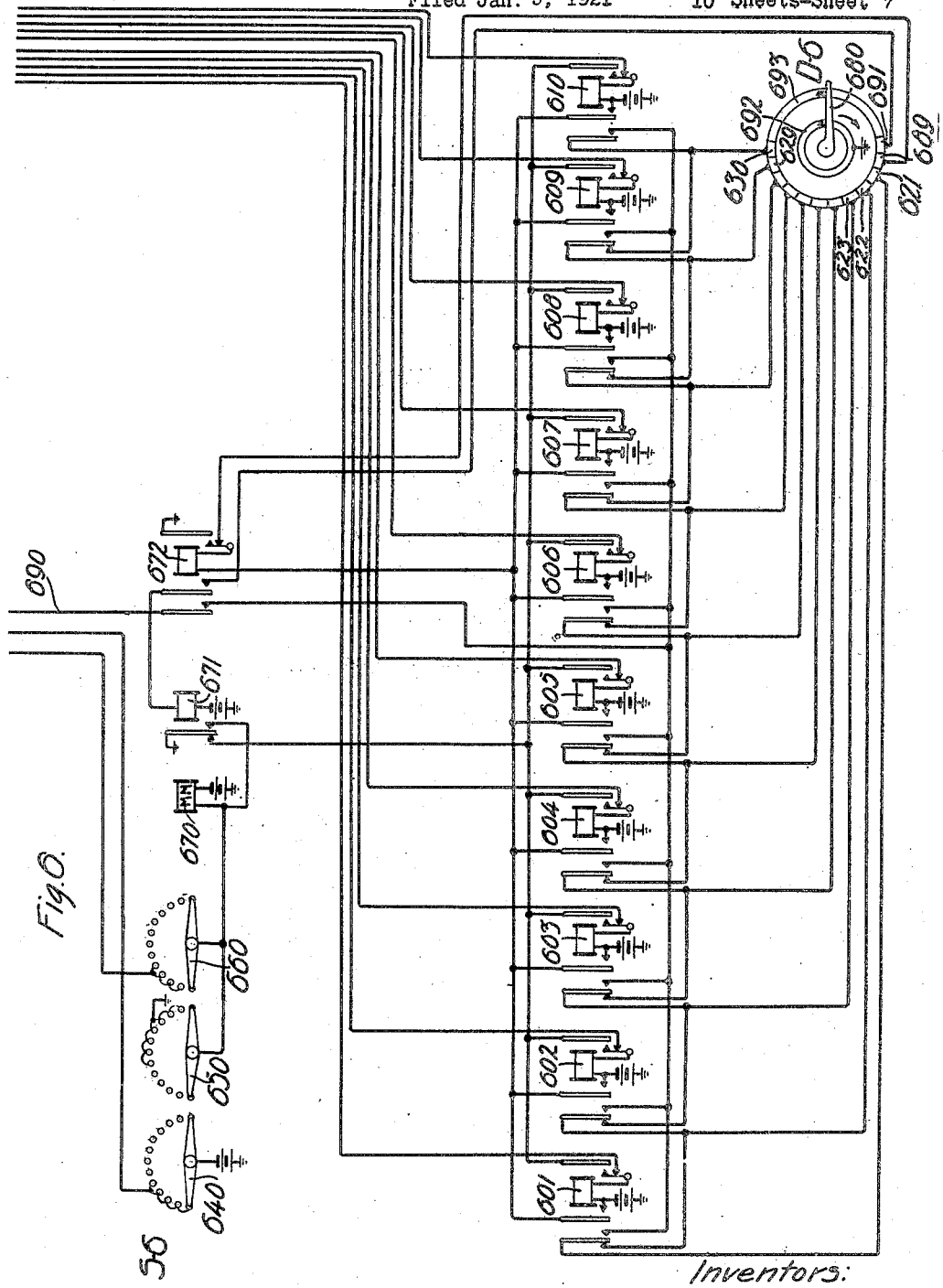

March 10, 1925.

R. S. WILBUR ET AL

TELEPHONE EXCHANGE SYSTEM

Filed Jan. 3, 1921   10 Sheets-Sheet 8

1,528,806

Fig. 7.

Inventors:
Ray S Wilbur,
Charles White
by E.R. Nowlan Atty

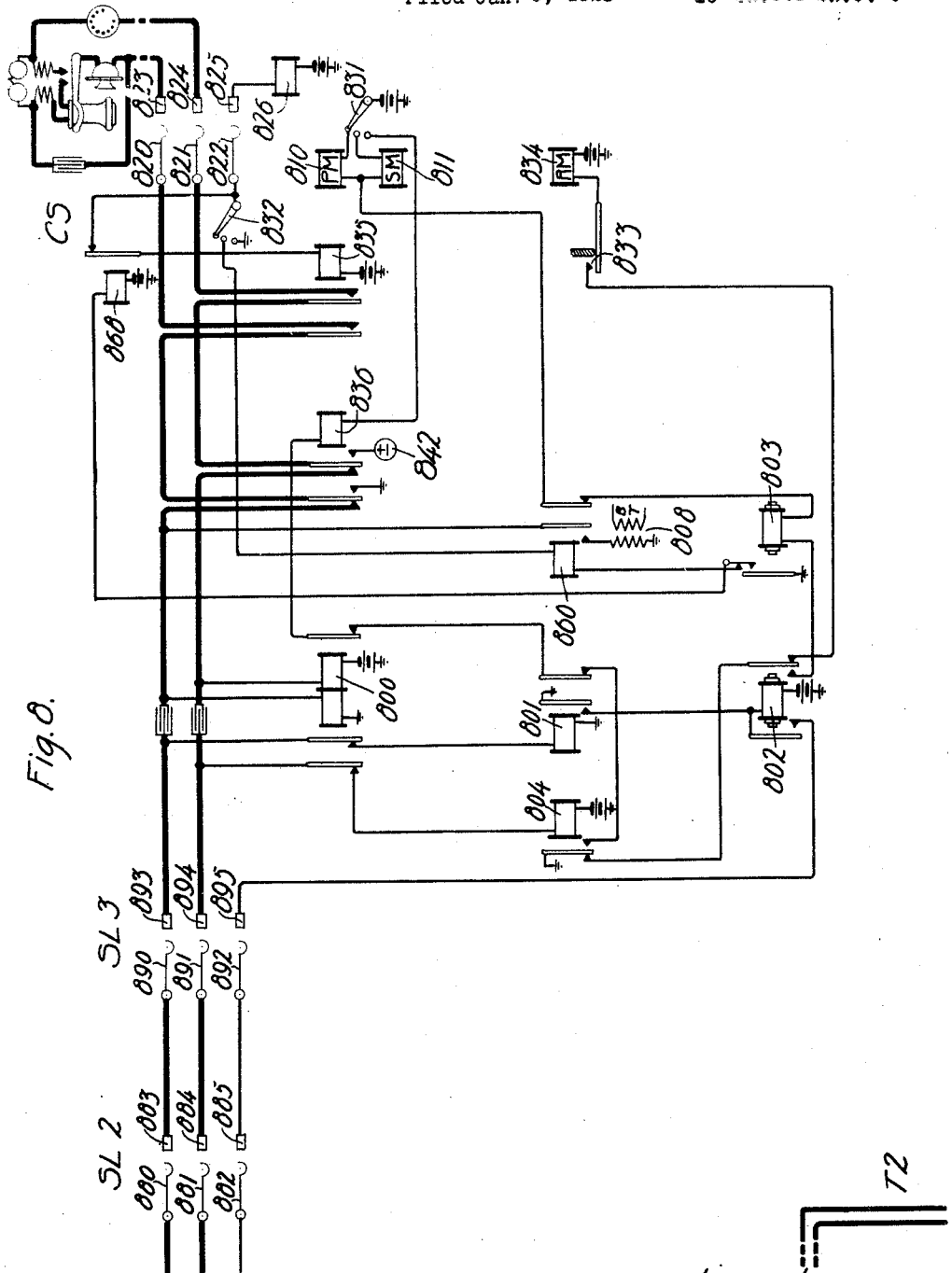

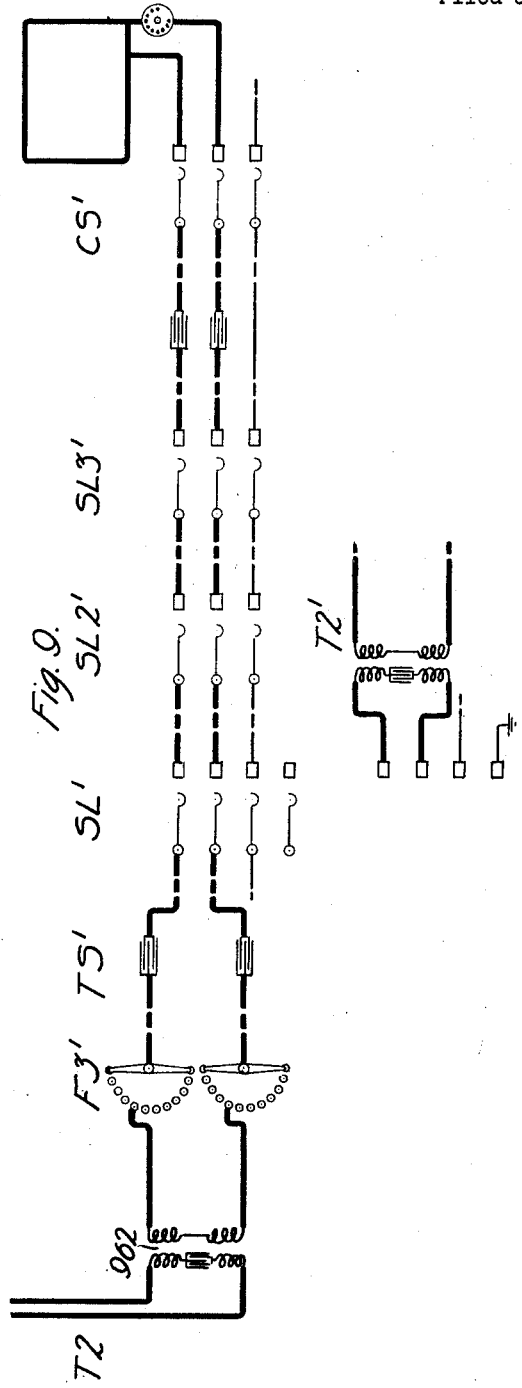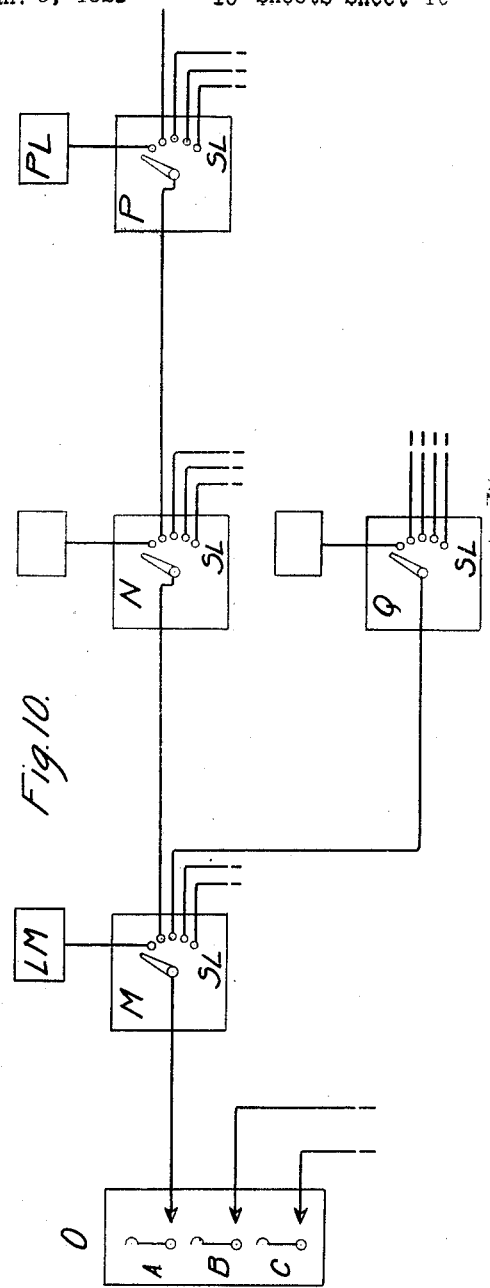

Patented Mar. 10, 1925.

1,528,806

UNITED STATES PATENT OFFICE.

RAY S. WILBUR, OF LYNDHURST, AND CHARLES WHITE, OF EAST ORANGE, NEW JERSEY, ASSIGNORS TO WESTERN ELECTRIC COMPANY, INCORPORATED, OF NEW YORK, N. Y., A CORPORATION OF NEW YORK.

TELEPHONE-EXCHANGE SYSTEM.

Application filed January 3, 1921. Serial No. 434,680.

*To all whom it may concern:*

Be it known that we, RAY S. WILBUR and CHARLES WHITE, citizens of the United States, residing at Lyndhurst and East Orange, in the counties of Bergen and Essex, State of New Jersey, respectively, have invented certain new and useful Improvements in Telephone-Exchange Systems, of which the following is a full, clear, concise, and exact description.

This invention relates to telephone exchange systems, and more particularly to such systems comprising a plurality of exchanges interconnected by toll lines in which the building up of connections is accomplished by means of machine switching apparatus.

One of the objects of the invention is to provide improved methods and means for enabling an operator at an originating exchange to extend a connection over a toll line to a subscriber's station at a distant exchange by means of automatic switching mechanism.

Another object of the invention is to provide improved means for enabling the operator at the originating exchange to automatically select a local trunk or a through toll line at any one of a plurality of distant exchanges, and to thereafter control the machine switching mechanism thereat to establish a connection with any local subscriber of the selected distant exchange.

Another object of the invention is to provide improved methods and means for furnishing the operator with complete supervision over the established connection regardless of the number of exchanges involved in the building up of the connection.

A further object is to translate into combinations comprising varying numbers of impulses, combinations of equal numbers of impulses simultaneously transmitted and simultaneously received.

To attain the objects of the invention, means are provided whereby, the building up of a connection from the originating exchange to the subscriber's station at the distant exchange and the supervision of an established connection is controlled by means of a plurality of relatively high frequency currents applied simultaneously to the toll line interconnecting the exchanges.

At the originating exchange there is provided an impulse sender comprising a plurality of sets of digit keys, which may be set in any combination required to represent any line number of any exchange of the system, and an automatic switching device for successively associating the depressed keys with the selected toll line. The actuation of a digit key may impress simultaneously upon the selected toll line, a plurality of relatively high frequency currents. At each distant exchange there is provided a plurality of switching trunks. Common to the switching trunks at each distant exchange is an impulse receiving device comprising means for filtering, rectifying and translating the relatively high frequency currents into direct current impulses, characteristic of the number represented by the depressed digit key. Means also controlled by high frequency currents is provided for automatically connecting an idle switching trunk to a selected toll line and to connect the impulse receiving device to the switching trunk taken for use. If the number set up by the operator represents the number of a local subscriber at the first distant exchange, the brushes of a selector switch, in which the selected switching trunk terminates will be moved to a level to which local trunks are connected. The remaining impulses delivered from the impulse sender at the operator's position at the originating exchange will then be received by the impulse receiving device, filtered, rectified, and translated into direct current impulses, to directively control the remaining switches of the train of switches involved in the building up of the connection to the local subscriber. If the number set up by the operator at the originating exchange indicates that a through toll line is desired, the selector to which the switching trunk is connected will be moved to select an idle through toll line. The impulse receiving device at the first distant exchange will then be rendered inoperative to further impulses transmitted by the sender at the originating operator's position. As soon as the through toll line outgoing from the first distant exchange has been selected, an idle switching trunk at the succeeding exchange will be automatically connected to the toll line extending from the originating exchange, and the impulse receiving device at the second distant exchange will be associated with the toll line, to receive the remaining impulses transmitted by the impulse sender at the operator's position, to cause automatic switching mechanism at the second distant exchange to be actuated to connect with a local subscriber of said second distant exchange, or to select another through toll line and thereafter actuate switches accessible thereto, depending upon the number set up by the operator. The various supervisory signals at the originating exchange are under switch-hook control of the subscriber at the distant terminating exchange. Upon receiving the disconnect signal, the operator at the originating exchange by the actuating of a manual switch causes a plurality of relatively high frequency currents to be impressed simultaneously upon the toll line. These currents are received by a frequency current receiving device at each exchange, involved in the established connection. These high frequency currents are filtered and rectified and cause electro-magnetic means to be actuated at each exchange, to release the automatic switching mechanism thereat.

These and other objects of the invention will be more readily understood by reference to the accompanying drawings in which Figure 10 shows a general layout of a system to which this invention applies, and in which Figures 1, 1^A and 2 to 8 inclusive when arranged as shown in Fig. 11, show detailed circuits and the arrangement of apparatus for building up a connection between an operator at the originating exchange and a subscriber at a first distant exchange. Figures 1, 1^A and 2 to 9 inclusive show partly in full and partly schematically the arrangement of circuits and apparatus for building up a connection between an operator of an originating exchange and a local subscriber of a second distant exchange. Figure 1 includes a portion of a link circuit at an operator's position at the originating exchange together with a switch F for associating an automatic switching device, herein termed, sender switch SW, with the circuit; Figure 1^A includes an impulse sender S comprising a plurality of sets of digit keys; Figure 2 includes a portion of the link circuit at the originating operator's position together with an automatic switch F—2 for extending the link circuit to one of a plurality of toll lines T, leading to a distant exchange; Figure 3 includes a switching device D, herein termed distributor, for associating a receiving circuit R with the link circuit and the toll line T; Figure 4 includes a portion of the incoming end of the line and a portion of a switching trunk TS; Figure 5 includes a switching device D—2, herein termed a distributor, an automatic switch F—4, and a receiving circuit R—3 which is common to a plurality of switching trunks; Figure 6 includes an impulse registering and translating device comprising a set of relays and a distributor D—6 and a switch S—6 for associating the registering and translating device with the impulse conductor of the switching trunk TS; Figure 7 includes a portion of the switching trunk TS, which terminates in the selector switch SL, brushes of the selector switch SL having access to local trunks and through toll lines; Figure 8 includes a schematic representation of selector switches SL², SL³, a complete circuit of a connector switch CS and the station circuit arrangement of a called subscriber's station. Figure 9 shows schematically the incoming end of a toll line at a second distant exchange and switches accessible thereto, for building up a connection to a called subscriber's station at said second distant exchange or to the outgoing end of a through toll line thereat.

Referring to Figure 10 there is shown at an originating operator's position O, three group keys A, B and C which correspond to the group keys A, B and C shown in Figure 2 of the drawings. By actuating group key A an idle toll line extending in one general direction, for example, a northernly direction will be selected; by actuating key B an idle toll line extending in another general direction, for example, a southernly direction will be selected etc. The operator having extended a connection to a first distant exchange M by actuation of key A, may then actuate the selector switch SL which corresponds to the switch SL shown in Figure 7 of the drawings to extend the connection through succeeding switches to a local subscriber at exchange M, said switches and station being diagrammatically indicated by the rectangle LM, or she may extend the connection to a through toll line extending either to exchange N or Q. From either of these exchanges the connection may be extended to local subscribers thereof or to through toll lines. If the connection is extended to switch N and thereafter to exchange P the switch SL at exchange P may then be actuated to extend the connection to a local subscriber over automatic switches, diagrammatically represented by the rectangle PL, or to extend the connection to a through toll line. This operation may be continued through as many exchanges as desired.

The automatic switches herein shown are of the well known step-by-step type.

The distributors may be of any suitable design. The distributor D—6 comprises a plurality of segments insulated from each other adapted to be wiped over by a constantly rotating brush. The distributors D and D—2 shown in the drawings comprise a plurality of rows of contacts all insulated from each other. Cooperating with the rows of contacts are a number of brushes, one brush for each contact of the row. The brushes may be mounted on a common shaft (not shown), which may be constantly rotated by any suitable means.

Devices for filtering and converting filtered currents into unidirectional currents are well known in the art and such devices have therefore been indicated simply by rectangles.

Assuming that the operator at the originating exchange desires to establish a connection with a subscriber at the distant exchange M, she will actuate the key K and the line group key A and then set the keys of the impulse sender S in accordance with the number desired. Actuation of key K causes the switch F to be actuated to associate the sender S with the link circuit taken for use, and actuation of the key A causes the switch F—2 to be actuated to select an idle line circuit of the group of lines extending to the distant exchange M. Actuation of key A, which is of the locking type, causes relay 211 to be operated over an obvious circuit. Actuation of key K causes relay 209 to be operated over a circuit extending from grounded battery, winding and right-hand normal contacts of relay 209, right-hand contacts of key K and front contact and left-hand armature of relay 211 to ground. Relay 209 in operating locks up through its right-hand alternate contacts under control of the locking key K. Relay 209 in operating also completes a circuit for relays 225, 214, 108 and 110 over a path extending from ground, left-hand armature and front contact of relay 209, and thence in parallel, one path extending through the winding of relay 225 to grounded battery, another path extending through the winding of relay 214 to grounded battery, and another path extending through the outer right-hand armature and back contact of relay 107, and thence through the windings of relays 108 and 110 in parallel to grounded battery. Relay 108 in operating completes a circuit for slow-to-release relay 106 over a path extending from ground, armature and front contact of relay 108, contact 146 and brush 133 of switch F, winding of relay 106 and back contact and outer left-hand armature of relay 105 to grounded battery. Relay 106 in operating completes an operating circuit for motor magnet 122 of the switch F. The operating circuit of magnet 122 may be traced as follows: grounded battery, winding, back contact and armature of magnet 122, left-hand armature and front contact of relay 106, brush 133 and contact 146 of switch F, and front contact and armature of relay 108 to ground. Under the control of magnet 122 the brushes 130 to 135 inclusive of switch F will be moved over their associated contacts until contact 143, to which the link circuit which has been taken for use is connected, is reached, when the energizing circuit for relay 106 is opened, thereby causing the release of relay 106 which in releasing opens the operating circuit for magnet 122. Assuming that a link circuit is connected to each of the contacts with which brush 133 engages, it will be noted that all contacts except that contact corresponding to the line taken for use has ground connected thereto so that relay 106 and motor magnet 122 find a ground on such contacts to complete their circuits.

As soon as the link circuit taken for use has been reached and relay 106 releases, relay 105 operates over a path extending from grounded battery, winding, inner left-hand normal contacts of relay 105, back contact and right-hand armature of relay 106, brush 131 and contact 141 of switch F, and inner right-hand armature and back contact of relay 107 to ground. Relay 105 in operating locks through its inner left-hand alternate contacts under control of relay 107. Relay 105 in operating completes a circuit through its outer left-hand alternate contacts for relay 103, which in operating connects ground through its inner armature and front contact brush 133 and contact 143 to place a busy test on this contact. Relay 103 in operating also causes the energization of relay 216 over a path extending from ground, front contact and outer armature of relay 103, outer right-hand armature and back contact of relay 102, brush 132 and contact 142 of switch F, and winding of relay 216 to grounded battery.

During the time that magnet 122 was operating to connect the sender S with the link circuit taken for use, motor magnet 203 of the switch F—2 was operating to select an idle line of the group A extending to the distant exchange M. When group relay 211 operated, ground was connected through its inner right-hand contacts to the contacts of the a group with which the brush 254 is associated, and ground was also extended through the outer right-hand contacts of relay 211, through the left-hand contacts of relay 214, through the armature and back contact of relay 222, winding of relay 224, and the back contact and left-hand armature of relay 223 to grounded battery; current flowing over the latter traced circuit causes the energization of relay 224. Relay 224, in operating, completes an operating circuit for stepping magnet 203, over a path extending from grounded battery, winding, armature and back contact of magnet 203, front contact and right-hand armature of relay 224, back contact and armature of relay 222, front contact and left-hand armature of relay 214 and front contact and outer right-hand armature of relay 211 to ground. Magnet 203, in operating, moves the brushes 250 to 255 inclusive over their associated contacts until the contacts $a$ of the desired group are reached, whereupon relay 222 operates over a path extending from grounded battery, winding of relay 222, brush 254 and contact 266 of switch F—2 and front contact and inner right-hand armature of relay 211 to ground. Relay 222, in operating, disconnects ground at the contacts of relay 211 from relay 224 and magnet 223. If the first line circuit of the selected group $a$, is busy, ground will be present upon the contact with which brush 253 of the switch F—2 is in engagement and this ground will maintain the operating circuit for relay 224 and magnet 223 closed. In the present instance, it has been assumed that the first two lines (not shown) of the group $a$ are busy, so that motor magnet 203 steps the brushes 250 to 255 inclusive of the switch F—2 into engagement with the third line of the group $a$, which has been assumed to be idle. As soon as brush 253 engages contact 263 of the switch F—2 the operating circuit for magnet 203 and relay 224 will be open thereby releasing relay 224 and causing magnet 203 to cease stepping. Relay 224, in retracting its armatures, completes a circuit for relay 223 over a path extending from grounded battery, winding and right-hand normal contacts of relay 223, back contact and left-hand armature of relay 224, brush 252 and contact 262 of switch F—2 and winding of relay 234 to ground. Relay 223, in operating, locks up through its right-hand alternate contacts to ground through the winding of relay 234. Relay 223, in operating, removes battery from the winding of relay 224. Relay 234 operates in series with relay 223 over the path traced and in attracting its armature places ground on the contact 263 for the purpose of rendering the selected toll line busy.

It will be remembered that a circuit was completed for relay 216 as soon as the switch F had associated the sender S with the link circuit. Relay 216 in operating connects 700 cycle current to the link circuit which passes over the toll line conductors leading to the distant exchange causing relay 535 associated with the distributor D—2 to deenergize. The relay 535 in operating causes the line relay at the distant exchange to be operated. The path for the energization of relay 535 may be traced as follows: from source 201 of 700 cycle current through the front contact and inner armature of relay 216, brush 250 and contact 260 of switch F—2, upper left-hand winding of repeating coil 269, condenser 268, lower left-hand winding of repeating coil 269, contact 261 and brush 251 of switch F—2 and contacts 230 of relay 216 to source of 700 cycle current. Current passing through the left-hand winding of repeating coil 269 induces a corresponding current in the right-hand winding thereof which traverses the conductors 298 and 299 extending to the distant exchange whereat this current is induced from the left-hand winding into the right-hand winding of repeating coil 469. This induced current then traverses a path extending from ground, through the 700 cycle filtering and rectifying device 580, brush 511 and segment 521 of distributor D—2, when the brush 511 during rotation passes over segment 521, conductor 402, right-hand windings of repeating coil 469, conductor 401, segment 520 and brush 510 of distributor D—2, through the 700 cycle filtering and rectifying device 580 and winding of relay 535, to grounded battery.

Relay 535 in operating completes a circuit for the energization of line relay 400 over a path extending from ground, armature and back contact of relay 539, right-hand armature and back contact of relay 538, outer right-hand armature and back contact of relay 537, outer right-hand armature and back contact of relay 536, outer right-hand armature and front contact of relay 535, brush 518 and segment 528 of distributor D—2, back contact and inner armature of relay 409 and right-hand normal contacts and winding of relay 400 to grounded battery. Relay 400 in operating locks up through its right-hand alternate contacts to ground at the outer armature and back contact of relay 409. Relay 400 in operating completes a circuit for the energization of slow-to-release relay 444 over a path extending from ground, front contact and inner left-hand armature of relay 400, contact 498 and brush 453 of switch F—3, winding of relay 444, and back contact and inner right-hand armature of relay 443 to ground.

Relay 444, in operating, completes an operating circuit for stepping magnet 404 over a path extending from grounded battery, winding, armature and back contact of magnet 404, front contact and left-hand armature of relay 444, brush 453 and contact 498 of switch F—3, and inner left hand armature and front contact of relay 400 to ground. Under the control of magnet 404 the brushes 450 to 455 inclusive of the switch F—3 are stepped over their associated contacts until brush 453 reaches the contact to which the toll line taken for use is connected. No ground will be present upon the contact 463 to which the selected toll line T is connected so that relay 444 releases and magnet 404 ceases stepping, whereupon the brushes 450 to 455 inclusive of switch F—3 will be brought to rest upon the contacts 460 to 465 inclusive, respectively. As soon as relay 444 retracts its armature relays 443 and 409 operate over a path extending from grounded battery, winding, left-hand normal contacts of relay 443, back contact and right-hand armature of relay 444, brush 454 and contact 464 of switch F—3, and winding of cut-off relay 409 to ground through the back contact and armature of relay 440. Relay 443, in operating, locks through its left-hand alternate contacts in series with cut-off relay 409 over the circuit traced and completes an obvious circuit through its inner right-hand contacts for relay 769. Relay 409, in operating, opens the locking circuit for line relay 400, whereupon said line relay retracts its armatures.

At the same time that relay 400 operated to start the actuation of switch F—3 to connect the trunk TS with the toll line T, relay 441 of the trunk circuit TS operated to connect the impulse receiving circuit R—3 with the trunk circuit T. The path for the energization of relay 441 is as follows: grounded battery, winding and right-hand normal contacts of relay 441, back contact and outer right-hand armature of relay 443, brush 454 and contact 497 of switch F—3 and inner left-hand armature of relay 400 to ground. Relay 441 in operating locks up through its alternate contacts under control of the switch SS and remains operated during two cycles of the distributor D—2. The operation of the switch SS will first be described before the operation of the switch F—4 is described.

Relay 441, in operating, completes an obvious circuit through its inner left-hand contacts for energizing relays 442 and 445 in parallel. Relay 442 in attracting its armatures connects 900 cycle current to the trunk circuit TS which current is connected to the toll line for two cycles of the distributor D—2. Relay 445 in operating completes a circuit for magnet 405 over a path extending from grounded battery winding of magnet 405 front contact and outer right-hand armature of relay 441, front contact and armature of relay 445, brush 455 and contact 465 of switch F—3 segment 529 and brush 519 of distributor D—2 and winding of relay 539 to ground. Magnet 405 receives two impulses over this circuit during two successive cycles of distributor D—2 and moves the brushes 470, 480 and 490 of switch SS from their first to their third positions. In the third position of the brushes an obvious circuit for magnet 405 is completed through brush 490 and the brushes are moved into their fourth positions.

Relay 441, in operating, operates relay 446 which controls the starting of motor magnet 586 of the switch F—4. The path for the energization of relay 446 may be traced as follows: grounded battery, winding and right-hand normal contacts of relay 446, front contact and outer left-hand armature of relay 441 and back contact and left-hand armature of relay 449 to ground. Relay 446 in operating locks up under control of relay 449. Relay 446 in operating completes a circuit for slow-to-release relay 552, associated with switch F—4, over a path extending from ground, left-hand armature and front contact of relay 446, contact 576 and brush 565 of switch F—4, winding of relay 552, and back contact and left-hand armature of relay 551 to grounded battery. Relay 552, in operating, completes an operating circuit for motor magnet 586 over a path extending from grounded battery, winding, back contact and armature of magnet 586, right-hand armature and front contact of relay 552, brush 565 and contact 576 of switch F—4, and front contact and left-hand armature of relay 446 to ground.

Under the control of magnet 586 the brushes 560 to 565 inclusive of switch F—4 are moved over their associated contacts until the terminal 575 with which the selected trunk circuit TS, is associated, and due to no ground being present upon this contact, relay 552 retracts its armature, thereby opening the operating circuit for magnet 586 so that said magnet 586 ceases stepping. All other contacts, except the one taken for use, over which brush 565 passes, will have ground present thereon. Relay 552 in retracting its armatures completes a circuit for relays 551 and 447 over a path extending from grounded battery, brush 640 and the normal contact of switch S—6, winding and right-hand normal contacts of relay 551, left-hand armature and back contact of relay 552, brush 564 and terminal 574 of switch F—4, back contact and outer left-hand armature of relay 448 and winding of relay 447 to ground. Relay 551, in operating, locks up through its right-hand alternate contacts in series with relay 447 under control of brush 640 of switch S—6. Relay 551, in operating, also completes an obvious circuit for relay 550, thereby connecting the toll line T to the receiving circuit R—3. Relay 447, which operated in series with relay 551 over the circuit above traced, in attracting its left-hand armature completes an obvious circuit for relay 449. Relay 449, in attracting its right-hand armature extends the impulse conductor 690 through to the impulse responsive relay 700 of the switch SL and in attracting its inner left-hand armature opens the locking circuit for relay 446, whereupon said relay 446 releases. Relay 449, in attracting its outer left-hand armature, connects battery to contact 529 of distributor D—2 so that as the brush 519, during rotation, passes over contact 529, relay 539 will be operated thereby preventing any of the switch setting frequencies which may be impressed upon the toll trunk line from affecting the receiving circuit R—2.

When relay 442 operated, 900 cycle current was connected to the toll line T, and this current, in conjunction with 700 cycle current which is at this time, present upon the talking conductors of the link circuit at the originating office, causes the operation of relays 330 and 331 of the receiving circuit R, and these relays in operating start the operation of the motor magnet 101 associated with the sender switch SW. The path for the energization of relay 330 may be traced as follows: grounded battery, winding of relay 330, through the 700 cycle filtering and rectifying device 380, brush 319 and contact 329 of distributor D, conductor 209, contact 261 and brush 251 of switch F—2, contacts 230 of relay 216, source 201 of 700 cycle current, front contact and inner armature of relay 216, brush 250 and contact 260 of switch F—2, conductor 208, contact 328 and brush 318 of distributor D, and thence through the 700 cycle filtering and rectifying device 380 to ground. The path for the energization of relay 331 may be traced as follows: grounded battery, winding of relay 331, through the 900 cycle filtering and rectifying device 381, brush 319 and contact 329 of distributor D, conductor 209, through the lower left-hand winding of repeating coil 269, condenser 268, upper left-hand winding of repeating coil 269, conductor 208, contact 328 and brush 318 of distributor D, and thence through the 900 cycle filtering and rectifying device 381 to ground; 900 cycle current from the source 487 is induced into the right-hand winding of repeating coil 269 over a path which may be traced from source 487, front contact and inner armature of relay 442, conductor 489, brush 451 and contact 461 of switch F—3, right-hand windings of repeating coil 469, contact 460 and brush 450 of switch F—3, conductor 488, and outer armature and front contact of relay 442 to source 487; current passing through the right-hand winding of repeating coil 469 induces a corresponding current in the left-hand winding thereof which current traverses the conductors 298 and 299 of the trunk circuit T and the right-hand winding of repeating coil 269 and is there induced into the left-hand winding of coil 269.

Relays 330 and 331, in operating, complete a circuit for the energization of relays 221, 215 and 104 to start the switch SW and cause the alternating current impulses characteristic of the digit keys depressed, to be delivered. These relays are operated over a path traceable from ground, armature and back contact of relay 339, left-hand armature and back contact of relay 332, outer left-hand armature and front contact of relay 331, contact 394 of relay 330, brush 312 and contact 322 of distributor D, left-hand normal contacts of relay 215, and thence in parallel, one path extending through the winding of relay 221 to grounded battery, and the other path extending through the winding of relay 215, contacts 231 of relay 216, inner left-hand armature and front contact of relay 110, contact 145 and brush 135 of switch F, front contact and outer right-hand armature of relay 105, brush 156 and its normal contact, and the winding of relay 104 to grounded battery. Relays 221, 215 and 104 are then locked up, to ground at the left-hand alternate contact of relay 215. Relay 215 in operating completes a circuit through its outer right-hand armature for relay 220, which relay, in operating, locks up temporarily under control of relay 221. Relay 104, in operating, completes a circuit for motor magnet 101 over a path extending from grounded battery, winding, armature and back contact of magnet 101, brush 151 of switch SW and its normal contact and front contact and armature of relay 104 to ground. Magnet 101 operates over this circuit and moves the brushes 150 to 156 inclusive of the switch SW one step into engagement with their second set of contacts. Brush 156 in moving from position 1 to position 2 opens the locking circuit for relays 104, and 215, whereupon these relays release. Relay 215, in releasing, releases relay 221. Relay 220 remains energized however as hereafter described.

In position 2 of the switch SW, relay 102 operates over a path extending from grounded battery, winding of relay 102, brush 154 and contact 160 of switch SW to ground. Relay 102 in operating opens the holding circuit for relay 216, whereupon said relay 216 releases. Relay 216, in releasing, establishes a substitute holding circuit for relay 220, in place of the holding circuit of the contacts of relay 221, over a path extending from grounded battery, winding and left-hand alternate contacts of relay 220, outer left-hand armature and back contact of relay 216, and right-hand armature and front contact of relay 110 to ground. When the brushes of switch SW are in their second position a circuit is completed for motor magnet 101 over a path extending from grounded battery, winding of magnet 101, brush 150 and its strapped contacts, inner armature and front contact of relay 102, and the right-hand contacts of the depressed units key, through the interrupter I to ground. Under the control of the interrupter I the magnet 101 is actuated and causes the brushes of the switch SW to be moved from their second to their third positions. Each time the brush 154 of the switch SW is moved one step, relay 102 may deenergize as the brush passes off a contact.

When the brushes of the switch SW are in their third position a circuit is completed for relay 102 over a path extending from grounded battery, winding of relay 102, brush 154 and contact 161 of switch SW, and outer left-hand contacts of key D to ground. Due to the energization of relay 102 the magnet 101 is actuated under the control of the interrupter I causing the brushes of the switch SW to be moved from their third to their fourth positions.

When the brushes of the switch SW are in their fourth position a circuit is again completed for relay 102 over a path extending from grounded battery, winding of relay 102, brush 154 and contact 162 of switch SW to ground. Magnet 101 is again actuated under the control of the interrupter I and moves the brushes into their fifth positions.

When the brushes of the switch SW are in their fifth position relay 102 is again energized over a path extending from grounded battery, winding of relay 102, brush 154 and contact 163 of switch SW, and outer left-hand normal contacts of key E to ground. Relay 102 in energizing again prepares a circuit for the actuation of motor magnet 101 under the control of the interrupter I. Under the control of the interrupter I the brushes of the switch SW are moved from their fifth to their sixth positions.

In the sixth position of the brushes of switch SW, relay 102 is again energized over a circuit extending from grounded battery, winding of relay 102, brush 154 and contact 164 of switch SW to ground. Under the control of the interrupter I the magnet 101 is again operated and moves the brushes of the switch SW into their seventh position.

When the brushes of the switch SW are in their seventh position a circuit is again completed for relay 102 over a path extending from grounded battery, winding of relay 102 and brush 154 and contact 165 of switch SW, and outer left-hand normal contacts of key F to ground. Relay 102 in operating again prepares the circuit for motor magnet 101 which is actuated under the control of the interrupter I and causes the brushes of the switch SW to be moved from their seventh to their eighth positions.

In position 8 of the brush of the switch SW, 700 cycle current is projected over the toll line to the distant exchange and causes the actuation of the relay 553 of the receiving circuit R—3. The path for the energization of relay 553 may be traced as follows: from grounded battery, winding of relay 553, through the 700 cycle filtering and rectifying device 590, outer armature and front contact of relay 550, brush 562 and contact 572 of switch F—4, front contact and outer right-hand armature of relay 447, back contact and outer armature of relay 442, conductor 488, brush 450 and contact 460 of switch F—3, right-hand winding of repeating coil 469, contact 461 and brush 451 of switch F—3, conductor 489, inner armature and back contact of relay 442, inner right-hand armature and front contact of relay 447, contact 571 and brush 561 of switch F—4, front contact and inner armature of relay 550, and thence through the 700 cycle filtering and rectifying device 590 to ground; the current in the right-hand winding of repeating coil 469 is induced from the left-hand winding of coil 469 over a path as follows: from source of 700 cycle current, right-hand contacts of L key 1 which was actuated at the time key A was actuated, contact 180 and brush 156 of switch SW, outer right-hand armature and front contact of relay 105, brush 135 and contact 145 of switch F, front contact and inner left-hand armature of relay 110, contacts 232 of relay 216, brush 251 and contact 261 of switch F—2, lower left-hand winding of repeating coil 269, condenser 268, upper left-hand winding of repeating coil 269, contact 260 and brush 250 of switch F—2, inner armature and back contact of relay 216, outer left-hand armature and front contact of relay 110, contact 144 and brush 134 of switch F, front contact and inner right-hand armature of relay 105, brush 155 and contact 173 of switch SW, left-hand contacts of L key 1 to source of 700 cycle current; current passing through the left-hand winding of repeating coil 269 induces a corresponding current in the right-hand winding thereof which traverses the toll line, conductor 298 and 299 and the left-hand winding of the repeating coil 469 at the distant exchange.

Relay 553, in operating, completes a circuit for the energization of relay 601 over a path extending from grounded battery, winding and right-hand normal contacts of relay 601, back contacts and inner left-hand armatures of relays 556, 555 and 554, and front contact and inner left-hand armature of relay 553 to ground. Relay 601, in operating, locks through its right-hand alternate contacts to ground at the normal contacts of relay 671. Relay 601, in operating, also prepares a circuit for the energization of relay 672 over a path extending from grounded battery, front contact and inner left-hand armature of relay 601, winding and right-hand normal contacts of relay 672, and segment 689 of distributor D—6. The brush 680 of distributor D—6 in rotating completes a circuit for relay 672, when said brush, during rotation, comes into contact with segment 689. Relay 672, in operating, locks over a circuit extending from grounded battery, front contact and inner left-hand armature of relay 601, winding and right-hand alternate contacts of relay 672 to ground. Relay 672 in operating connects the distributor D—6 to the impulse conductor 690, and brush 680 of the distributor D—6, during rotation, will transmit a number of impulses over the conductor 690 characteristic of the relay of the registering circuit which has been operated.

In the present instance relay 601 having been operated one impulse will be delivered over the impulse conductor 690 over a path extending from ground, segment 692, brush 680 and segment 621 of distributor D—6, outer left-hand armature and front contact of relay 601, front contact and outer left-hand armature of relay 672, conductor 690, brush 563 and contact 573 of switch F—4, front contact and right-hand armature of relay 449, and winding of impulse relay 700 to grounded battery.

As soon as the impulse or number of impulses has been delivered to the impulse conductor 690, the relays of the registering and translating circuit will be restored to normal position and the brushes of the switch S—6 will be moved into their second positions, thus preparing these relays for the next set of impulses. The brush 680 in passing over contact 691 completes a circuit for relay 671 over a path extending from grounded battery, winding of relay 671, inner left-hand armature and front contact of relay 672, segment 691, brush 680, segment 692 of distributor D—6 to ground. Relay 671 thereupon operates and completes an obvious circuit for magnet 670, which in operating moves the brushes 640, 650 and 660 of switch S—6 from their first to their second positions. Relay 671 in operating also opens the locking circuit for relay 601, whereupon said relay releases causing in turn the release of relay 672.

When the first impulse or set of impulses is delivered to the impulse responsive relay 700, of the selector switch SL, said relay 700 will be energized a number of times corresponding to the number of impulses transmitted thereto. In the present instance it has been assumed that one impulse has been delivered to the relay 700 so that this relay upon energization will complete a circuit for primary stepping magnet 728 and slow-to-release relay 712 over a path extending from grounded battery, side switch arm 753 and its first contact, windings of magnet 728 and of relay 712, and front contact and right-hand armature of relay 700 to ground. Magnet 728 in energizing causes the brushes 720 to 724 of the switch SL to be moved one step in a primary direction in the manner well known in the art. Relay 712 in operating completes an obvious circuit for escape magnet 731. Relay 712 is preferably of the slow-to-release type so as not to retract its armatures during the sending of a series of impulses. As soon, however, as a series of impulses has been transmitted to the impulse relay 700, said relay 700 retracts its armature thereby opening the operating circuit for slow to release relay 712. A short interval after the operating circuit for relay 712 is opened, relay 712 retracts its armature thereby opening the circuit of the escape magnet 731. Magnet 731 upon deenergization causes the movement of the side switch brushes 750 to 753 inclusive from their first to their second positions in the manner well known in the art.

In the second position of the side switch arm 753, an obvious circuit is completed for the secondary stepping magnet 729. Under the control of secondary stepping magnet 729 the brushes 720 to 724 inclusive of the switch SL are moved in a secondary direction over their associated contacts until an idle trunk circuit is found. Before the first step of the brushes 720 to 724 inclusive of switch SL in a secondary direction is taken, the secondary off normal contact 799 being closed, an energizing circuit for escape magnet 731 is completed over a path extending from ground, off normal contacts 799, side switch arm 752 in its second position and winding of magnet 731 to grounded battery. If the first trunk of the selected level is busy, ground potential will be present thereon so as to maintain escape magnet 731 energized, when contacts 799 are opened, as soon as the brushes of switch SL are moved in their secondary direction, whereas if the first trunk is idle no potential will be present on the test terminal so that magnet 731 will release. Assuming that brushes 720 to 724 inclusive have been moved into engagement with the terminals 730 to 733 inclusive of the succeeding switch SL—2, which is idle, no potential will be present upon test terminal 732, whereupon magnet 731 will deenergize thereby moving the side switch arms 750 to 753 inclusive from their second to their third position. Side switch arm 753 in passing from its second to third position opens the operating circuit for secondary magnet 729, whereupon said magnet ceases stepping.

It is thus seen from the foregoing description how a local trunk circuit at a distant exchange is selected in response to the depression of key L at the originating exchange. The manner in which a through trunk or toll line circuit at the first distant exchange may be selected by the depression of a characteristic key at the originating operator's position will be later described.

It is believed that it will be readily apparent from the description heretofore given as to how one or more succeeding selectors at the first distant exchange may be actuated in response to the depression of characteristic keys at the originating operator's position. The circuits of the selectors SL—2 and SL—3, diagrammatically indicated in Fig. 8 of the drawing, may be of any well-known type in which the operating magnets of the switch are controlled over a loop circuit. In order to simplify the description of operation of the system, the manner in which switches intervening between the switch SL and the connector switch CS at the first distant exchange are set will be omitted and a complete description will now be given of the method of operation of the connector switch CS employed for the purpose of establishing connection with a subscriber at the first distant exchange. It will be assumed however, the switches SL—2 and SL—3 have been moved to select idle trunks.

It will be noted that motor magnet 101 of the switch SW is moved successively from its eighth to its eleventh positions under control of the interrupter I over a path extending from grounded battery, winding of magnet 101, brush 150 and strapped contacts thereof, inner right-hand armature and front contact of relay 102, and the right-hand contact of the operated units key and the interrupter I to ground.

The brushes of switch SW in passing over their ninth and tenth positions may impress successively impulses, consisting of a plurality of frequencies simultaneously applied, upon the toll line provided keys of the Th and H rows are actuated which will be received by the receiving circuit R—3 and cause certain relays of the registering device to be operated in accordance with the digit key depressed at the sender S. Each time a relay or a plurality of relays of the receiving circuit R—3 operates, a relay of the registering device will be operated characteristic of the digit key depressed and this relay in operating will lock up and cause the energization of relay 672 in the manner heretofore described. Relay 672 in operating prepares a circuit for relay 671 and the brush 680 of the distributor D—6, in rotating, will cause the energization of relay 671, which in operating will operate the motor magnet 670 after each series of impulses have been delivered to the impulse conductor 690.

Since it has been assumed that the two digit keys have been operated at the impulse sender S in response to which the two selector switches SL—2 and SL—3 have been selectively operated to extend the toll line through to the connector switch CS, it will then be seen that two impulses will have been delivered to the motor magnet 670 so that the brushes 640, 650 and 660 of switch S—6 will now rest upon their fourth set of terminals.

In position 11 of the brushes of switch SW, 1100 cycle current will be projected over the toll line conductors and will be received by the receiving circuit R—3 causing the operation of relay 555 therein. Due to the tens key Te 3 being depressed, 1100 cycle current is projected through the make contacts of the tens key 3, contacts 176 and 182 of switch SW and their associated brushes and thence over the toll line over an obvious path and similar to that previously traced for relay 553, causing the energization of relay 555. Relay 555 in operating completes a circuit for the energization of relay 603 over a path extending from grounded battery, winding of relay 603, right-hand normal contacts of relay 603, outer right-hand armatures and back contacts of relay 553 and 554 and outer right-hand contacts of relays 555 and 556 to ground. Relay 603 in operating locks up through its right-hand alternate contacts under control of relay 671 and prepares an energizing circuit for relay 672 over a path similar to that previously traced for relay 672. The brush 680 of the distributor D—6, in rotating, completes a circuit for relay 672 which then locks up through its right-hand alternate contacts under control of relay 603. Relay 672 in operating closes the impulse conductor 690 to the distributor D—6 and brush 680 of the distributor D—6 in passing over its associated contacts will transmit three impulses to the impulse conductor 690 causing impulse relay 700 of the selector switch SL to be actuated three times. The path for the first impulse of the impulse conductor 690 may be traced as follows: ground, segment 692, brush 680 and segment 621 of distributor D—6, outer left-hand armature and back contact of relays 601 and 602, outer left-hand armature and front contact of relay 603, and front contact and outer left-hand armature of relay 672 to impulse conductor 690. The path for the second impulse to the conductor 690 may be traced as follows: ground, segment 692, brush 680 and segment 622 of distributor D—6, outer left-hand normal contacts of relay 602, outer left-hand alternate contacts of relay 603, and front contact and outer left-hand armature of relay 672 to conductor 690. The path for the third impulse to conductor 690 may be traced as follows: ground, segment 692, brush 680 and segment 623 of distributor D—6, outer left-hand alternate contact of relay 603, and front contact and outer left-hand armature of relay 672 to the impulse conductor 690.

As soon as this series of impulses has been transmitted to the impulse conductor 690, brush 680 of distributor D—6, in passing over segment 691, will again cause the energization of relay 671, thereby releasing relay 603, which in turn releases relay 672. Relay 671 in operating also delivers one impulse to magnet 670 of the switch S—6 causing the brushes 640, 650 and 660 to be moved from their fourth to their fifth position.

The manner in which the impulses for the units digit are conveyed to the impulse conductor 690 will be described before the operation of the connector switch is given.

The brushes of switch SW are moved from their eleventh to their twelfth positions due to relay 102 being energized in the eleventh position of the brushes causing thereby motor magnet 101 to be actuated under the control of the interrupter I in the manner previously described. After the units impulse is delivered by the sender S, the switch SW is automatically restored to normal. In the twelfth position of the brushes of switch SW, 900 and 1300 cycle current will be projected simultaneously through the left-hand make contacts of the units key 9, and thence through the contacts 177 and 183 of switch SW and the associated brushes 155 and 156 and thence over the trunk line to the receiving circuit R—3 causing the energization of relays 554 and 556 therein. Relays 554 and 556 in operating complete a circuit for the energization of relay 609 over a path extending from grounded battery, winding and right-hand contacts of relay 609, outer left-hand alternate contacts of relay 556, outer left-hand normal contacts of relay 555 and outer left-hand contacts of relay 554 and 553 to ground. Relay 609 in operating locks up through its right-hand alternate contacts under the control of relay 671 and prepares a circuit for the energization of relay 672 in the manner similar to that previously described, so that brush 680 in passing over segment 689 will cause the energization of relay 672. Relay 672 in operating locks up under control of relay 609. Brush 680 of the distributor D—6, in rotating, will cause nine impulses to be transmitted to the impulse conductor 690, in the manner similar to that previously described for the transmission of three impulses to the impulse conductor 690. The brush 680 in continuing its rotation again energizes relay 671 in the manner previously described, causing the release of relay 609, which in turn releases relay 672. Magnet 670 thereupon operates and moves the brushes of the switch S—6 from their fifth to their sixth positions, whereupon an interrupting circuit is completed for magnet 670, said circuit including the winding of magnet 670, brush 650 and the strapped contacts associated therewith. Under the control of magnet 670 the brushes 640, 650 and 660 of switch S—6 are restored to normal position.

As soon as brush 640 passes off its fifth contact, it opens the circuit for relays 551 and 447 so that these relays release. Relay 552 then operates over a path extending from grounded battery, left-hand armature and back contact of relay 551, winding of relay 552, brush 576 and contact 575 of switch F—4, and back contact and left-hand armature of relay 446 to ground. Relay 552 in operating again completes the operating circuit for motor magnet 586 and this magnet then steps the brushes 560 to 565 inclusive to normal position. When the normal position of the brushes is reached relay 552 releases, thereby opening the operating circuit for magnet 586.

Relay 447 in retracting its armatures releases relay 449 disconnects the receiving circuit R—3 and the switch F—4 from the trunk circuit TS and extends the toll line through to the connector switch CS. Relay 449 in retracting its outer left-hand armature removes battery from the segment 529 of the distributor D—2.

The manner in which the connector switch CS is actuated to extend the toll trunk line to the called subscriber will now be described. In response to the three impulses transmitted to the impulse conductor 690, impulse relay 700 will be energized three times. It should be noted that when the toll line is extended through the selector switch SL to the connector switch CS, relays 801 and 804 and 771 energize over a path extending from grounded battery, winding of relay 804, back contact and outer left-hand armature of relay 800, terminal 894 and brush 891 of switch SL—3, terminal 884 and brush 881 of switch SL—2, terminal 731 and brush 721 of switch SL, side switch arm 751 and its third contact, left-hand armature and back contact of relay 700, intermediate left-hand armature and back contact of relay 772, inner left-hand armature and back contact of relay 775, left-hand winding of relay 771, coil 753, back contact and inner left-hand armature of relay 772, third contact of side switch arm 750, arm 750, brush 720 and terminal 730 of switch SL, brush 880 and terminal 883 of switch SL—2, brush 890 and terminal 893 of switch SL—3, inner left-hand armature and back contact of relay 800, and winding of relay 801 to ground.

Relay 801, in operating, completes a circuit through its inner right-hand armature and front contact for slow to release relay 802. Relay 802 in operating locks up through its left-hand contacts to ground on the test brush 722 of switch SL.

In response to the three impulses transmitted to the impulse relay 700, the circuit for relays 771, 804 and 801 will be interrupted three times. At each interruption of the circuit of relay 804 a circuit is completed for the primary stepping magnet 810 of switch CS over a path extending from grounded battery, side switch arm 831 in its first position, winding of magnet 810, outer armature and back contact of relay 860, winding of relay 803, front contact and right-hand armature of relay 802, and back contact and left-hand armature of relay 804 to ground. Each completion of the circuit for magnet 810, causes magnet 810 to operate to move the brushes 820 to 822 inclusive one step in a primary direction. At the first closure of the circuit for primary magnet 810 slow to release relay 803 is energized in series therewith and completes a circuit for escape magnet 868 over a path extending from ground, alternate contacts of relay 803 and winding of magnet 868 to grounded battery. Relay 803 is of the slow to release type so as not to retract its armature during the sending of a series of impulses.

At the end of the first series of impulses, the talking conductors of the connector switch CS are closed for a relatively long interval of time, whereupon relay 803 retracts its armature thereby opening the circuit for magnet 868. Magnet 868 thereupon deenergizes and moves the side switch brushes 831 and 832 from their first to their second positions. In the second position of the side switch arm 831, a circuit is prepared for the secondary stepping magnet 811, and in response to each interruption of the circuit of relay 804, during the sending of the units impulses, a circuit is completed for stepping magnet 811 over a path extending from grounded battery, side switch arm 831 in its second position, winding of magnet 811, outer armature and back contact of relay 860, winding of relay 803, front contact and right-hand armature of relay 802, and back contact and armature of relay 804 to ground. Under the control of magnet 811 the brushes 820 to 822 inclusive are moved in their secondary direction until the brushes are brought into engagement with the terminals of the desired line. Relay 803 is again energized in response to the first impulse transmitted to the secondary magnet 811 and in operating again completes the circuit for escape magnet 868.

If the called line is idle, battery potential will be present upon the test terminal of the set of contacts to which the called line is connected. After the units impulses have been delivered to the connector switch CS, the circuit for relays 771, 804 and 801 remains closed so that relay 803 deenergizes. Relay 803 in retracting its armature extends the circuit of escape magnet 868 through to the test brush 822 of the switch CS, and since it has been assumed that the called line is idle and that battery potential is upon test conductor 825, escape magnet 868 immediately deenergizes thereby moving the side switch brushes from their second to their third positions.

In the third position of the side switch arm 832, ground is connected to the test terminal 825, thereby placing a busy test upon this terminal and operating a cut-off relay 826 of the called line. In position 3 of the side switch arm 831 a circuit is prepared for relay 836 over a path extending from grounded battery, side switch arm 831 in its third position, winding of relay 836, right-hand armature and back contact of relay 800, outer armature and back contact of relay 801, and front contact and armature of relay 804 to ground. Relay 836 when operated connects ringing current from a source 842 to the talking conductors of the trunk circuit, which current is projected over the called substation loop to signal the called subscriber in the well-known manner. Relay 801 which controls the application of ringing current to the called line is controlled by the operator at the originating exchange. Relay 801 is deenergized in response to the application of a plurality of sources of current to the line by operator.

As soon as the switch CS is set upon the terminals of the called line, a supervisory signal at the operator's position lights indicating to her that the called line may be signalled whereupon she applies the frequencies to the line. One manner in which the signal is lighted will first be described.

It will be remembered that as soon as the last impulse is transmitted by over the impulse conductor 690, switches S—6 and F—4 restore to normal, and relays 447 and 449 release. Relay 771 remains operated after all impulses have been delivered to the impulse relay 700. Relay 773 then operates over a path extending from ground, left-hand armature and back contact of relay 447, armature and front contact of relay 769, back contact and outer left-hand armature of relay 775, alternate contacts of relay 771, winding of relay 773, and right-hand armature and back contact of relay 776 to grounded battery. Relay 773 in operating completes a circuit at its outer left-hand armature and front contact for relay 770. Relay 770 in operating connects 700, 1100 and 1300 cycle current to the toll line for the purpose of causing the signal to be actuated at the originating operator's position to indicate to the operator that the brushes of the connector switch have been set upon the terminals of the desired line, and that ringing current may be applied to the toll line for the purpose of signaling the desired subscriber. Relay 773 remains operated during two steps of the switch SS, during which time the 700, 1100 and 1300 cycle current is connected to the toll line. These currents affect the receiving circuit R at the originating exchange. They do not affect the receiving circuit R—2 at the distant exchange due to the energization of relay 539.

The manner in which the 700, 1100 and 1300 cycle current is connected to the toll line during two steps of the switch SS is as follows. It will be noted that up to this time the brushes 470, 480 and 490 of switch SS have been resting in their fourth positions and that as soon as the last impulse was delivered to the impulse relay 700 and the brushes 720 to 724 inclusive of the switch CS, were set upon the terminals of the desired line, relay 449 releases. Two impulses are delivered to the motor magnet 405 by the distributor D—2 to cause said magnet to operate to move the brushes 470, 480 and 490 from their fourth to their sixth position, due to the closure of the left-hand contacts of relay 770. This path for the energization of motor magnet 405 may be traced as follows: grounded battery, winding of magnet 405, left-hand armature and front contact of relay 770, back contact and outer left-hand armature of relay 449, back contact and armature of relay 445, brush 455, and contact 465 of switch F—3, segment 529, and brush 519 of distributor D—2 and winding of relay 539 to ground. Relay 539 also energizes in this circuit. In the sixth position of the brushes of switch SS a circuit is completed for relays 776 and 777 over a path extending from ground, contact 471 and brush 470 of switch SS, and thence in parallel through the left-hand normal contacts and windings of relays 776 and 777 to grounded battery. Relay 776 thereby operates and locks up through their left-hand alternate contacts to ground at the left-hand contacts of relay 447 under control of relay 771. Relay 776 in operating removes battery from the winding of relay 773, causing the release of relay 773, and it in turn causes the release of relay 770. Relay 770 in releasing removes the 700, 1100 and 1300 cycle current from the toll line.

In the sixth position of the brushes of switch SS an obvious circuit is completed for magnet 405 through brush 490 to move the brushes into their seventh position.

During the time that the 700, 1100 and 1300 cycle current was impressed upon the toll line, relays 330, 332, and 333 of the receiving circuit R at the originating exchange were energized, causing in turn the energization of relay 218. The path for the energization of relay 218 may be traced as follows: ground, armature and back contact of relay 339, left-hand alternate contacts of relay 333, inner left-hand alternate contacts of relay 332, inner left-hand normal contacts of relay 331, contacts 392 of relay 330, brush 315 and segment 325 of distributor D, and right-hand normal contacts and winding of relay 218 to grounded battery.

Relay 218 operating, locks up over a path extending from grounded battery, right-hand alternate contacts and winding of relay 218, left-hand normal contacts of relay 219 and front contact and inner right-hand armature of relay 214 to ground. Relay 218 in operating completes a circuit through its left-hand contacts for supervisory signal 299 which thereupon lights, indicating to the operator that ringing current may now be applied to the toll line.

The operator may then depress the ringing key RK causing thereby 700, 900, and 1100 cycle current to be impressed upon the toll line, which current is received by the receiving circuit R—2 at the distant exchange causing the operation of relays 535, 536 and 537 therein. These frequencies being impressed upon the conductors 401, 402 at the distant exchange, are picked up by the brushes 510, 511 during rotation, and are filtered and rectified by the 700, 900 and 1100 cycle filtering and rectifying devices 580, 581, and 582, respectively, causing thereby the relays 535, 536, and 537 to be actuated over obvious parallel circuits. These relays in operating cause the energization of relay 772 over a path extending from grounded battery, winding of relay 772, outer right-hand armature and back contact of relay 775, brush 452, and contact 462 of switch F—3, segment 526 and brush 516 of distributor D—2, contacts 530 of relay 535, contacts 531 of relay 536, front contact and outer right-hand armature of relay 537 and back contact and right-hand armature of relay 538 to ground at the back contact and armature of relay 539. Relay 772, in operating disconnects relay 771 from the relays 804 and 801 of the connector switch CS and grounds simultaneously the tip and ring talking conductors of the connector switch CS. Relay 771 remains energized however during the time that relay 772 is energized due to the right-hand winding of relay 771 being connected in parallel with the winding of relay 772. The contacts of relay 772 are so designed that relay 771 remains energized when relay 772 releases.

Relay 772 remains operated and thus applies ringing current to the called line during the time that switch SS takes two steps in the following manner. Relay 772 in attracting its right armature locks to ground through brush 480 and the seventh contact of switch SS and in attracting its outer left-hand armature prepares a circuit for motor magnet 405 over a path extending from grounded battery, winding of magnet 405, outer left-hand armature and front contact of relay 772, back contact and outer left-hand armature of relay 449, back contact and armature of relay 445, brush 455 and contact 465 of switch F—3, segment 529, and brush 519 of distributor D—2 and winding of relay 539 to ground. The brush 519 passing over the segment 529 causes two actuations of the magnet 405 over the circuit traced thereby moving the brush 470, 480, and 490 of the switch SS from their seventh to their ninth positions. The brush 480 of switch SS is of the bridging type so that relay 772 remains energized until brush 480 centers on its ninth contact. In the ninth position of the brush 480 of the switch SS, ground is removed from the winding of relay 772, whereupon said relay releases and renders the conductors of the circuit TS continuous, and disconnects ground from the tip and ring conductors of the connector switch CS. Under control of magnet 405 the brushes of the switch SS are then advanced to normal position. Should the called subscriber fail to respond after a reasonable time, the operator may again press the ringing key RK causing the relay 772 to be again operated for two steps of the switch SS to cause the signalling of the desired subscriber. This operation may be repeated as many times as desired.

When the tip and ring conductors of the connector switch CS are simultaneously grounded, relay 801 releases, but relay 804 remain energized. Relay 801, in retracting its armatures, completes a circuit for ringing relay 836 over the path previously traced. Relay 836 in operating causes the called subscriber to be signaled over a path extending from source of ringing current 842, front contact and inner armature of relay 836, inner armature and front contact of relay 835, brush 821, and terminal 824 of switch CS, through the called substation loop, terminal 823 and brush 820 of switch CS, front contact and outer armature of relay 835, and outer armature and front contact of relay 836 to ground. As heretofore described relay 836 remains operated during two steps of the switch SS, after which time its operating circuit is opened due to the energization of relay 801.

When the called subscriber answers relay 800 will be operated as soon as the ringing current is removed from the line over an obvious circuit. Relay 800 in attracting its left-hand armatures causes the deenergization of relays 804, 801, and 771. Relay 771, in retracting its armature, completes a circuit for relays 774 and 779 over a path extending from ground, armature and back contact of relay 447, armature and front contact of relay 769, back contact and outer left-hand armature of relay 775, armature and back contact of relay 771, and thence in parallel, one path extending through the winding of relay 774 to grounded battery, and the other path extending through the inner left-hand armature and back contact of relay 773, winding of relay 779, and right-hand normal contacts of relay 777 to grounded battery. Relay 779 in operating completes an obvious circuit through its front contact for relay 770.

Due to the operation of relays 770 and 779, 700, 900, 1100 and 1300 cycle currents from the source 782 are impressed upon the toll line for two steps of the switch SS, causing the operation of relays 330, 331, 332 and 333 at the originating exchange. The manner in which these frequencies are impressed upon the toll line for two steps of the switch SS is as follows: relay 770, in operating, again prepares a path similar to that previously traced for the operation of magnet 405, and when the brush 519 engages the contact 529 of the distributor D-2, relay 539 of the distributor D-2 and magnet 405 will be operated in series. Relay 539, in operating, removes ground from the receiving circuit R-2 so as to prevent these frequencies from affecting the receiving circuit R-2 at the distant exchange, and magnet 405 moves the brushes 470, 480 and 490 one step. This operation is repeated and the brushes 470, 480 and 490 are moved an additional step whereupon the circuit similar to that previously traced is again completed for relays 776 and 777. Relay 776, in operating, locks up over the path previously traced, and relay 777 in operating opens the circuits of and releases relays 779 and 774 causing the release of the two latter named relays, thereby removing the 700, 900, 1100 and 1300 cycle current from the toll line.

Relays 330 to 333 inclusive of the receiving circuit R in operating complete a circuit for the energization of relay 219 over path extending from grounded battery, winding of relay 219, winding of normal contacts of relay 219, segment 327 and brush 317 of distributor D, left-hand inner alternate contact of relays 330 to 333 inclusive and back contact and armature of relay 339 to ground. Relay 219, in operating, opens at its left-hand contacts, the holding circuit for relay 218 whereupon said relay 218 retracts its armatures thereby extinguishing supervisory signal 299, thus indicating to the operator that the called party has responded.

At the conclusion of conversation and the restoration of the receiver to the switchhook at the called station, relay 800 retracts its armatures, thereby again completing the circuit for relays 804, 771 and 801. Relay 771, in operating, completes a circuit for relay 773 over the path previously traced. Relay 773 in operating again completes a circuit for relay 770. Due to the operation of relay 770, the 700, 1100, and 1300 cycle currents from the source 781 are again impressed upon the toll line causing the energization of relays 330, 332 and 333 of the receiving circuit R at the originating exchange. These frequencies remain connected to the toll line for two steps of switch SS in a manner previously described. Relays 330, 332 and 333 in operating again complete the circuit previously traced for relay 218 whereupon said relay operates, locks up, and completes a circuit for the lighting of supervisory signal 299 which serves as a signal to the operator at the originating exchange that the called party has hung up his receiver.

If the called subscriber wishes to attract the attention of the operator at the originating exchange he will flash, i. e., rapidly open and close the line circuit extending to her station by actuating the receiver switch hook. Each time the loop of the called substation is closed, relay 800 will operate causing the deenergization of relay 771, and each time the loop of the called subscriber is open, relay 800 will release causing the energization of relay 771. At the first deenergization of relay 771 slow-to-release relay 774 will operate over grounded battery, winding of relay 774, armature and back contact of relay 771, back contact and outer armature of relay 775, front contact and armature of relay 769 and back contact and left-hand armature of relay 447 to ground. At the first energization of relay 771, during the flashing, relay 773 will operate over a path extending from grounded battery, armature and back contact of relay 776, winding of relay 773, front contact and armature of relay 771, outer left-hand armature and back contact of relay 775, front contact and armature of relay 769 and back contact and left-hand armature of relay 447 to ground. Relay 774 is preferably of the slow-to-release type, so as not to retract its armature during the rapid interruptions of the line circuit, so that relay 773 upon its energization locks to ground at the front contact and armature of relay 774. Relay 773 in operating completes a circuit at its outer left-hand armature for relay 770 and at its inner left-hand armature for relay 778, over a path extending from grounded battery, right-hand normal contacts of relay 777, winding of relay slow-to-release 778, front contact and inner left-hand armature of relay 773, back contact and armature of relay 771, outer left-hand armature and back contact of relay 775, front contact and right-hand armature of relay 769 and left-hand contacts of relay 447 to ground. Due to the operation of relays 770 and 778, 700, 900, 1300 cycle current from a source 780 is impressed simultaneously upon the toll line conductors for two cycles of the switch SS, which current will be received by the relays 330, 331 and 333 of the receiving circuit R at the originating exchange. The manner in which the flashing signal is projected for two steps of the switch SS, is similar to that previously described, magnet 405 being started in its operation as heretofore described by the closure of the left-hand contacts of relay 770.

Relays 330, 331 and 333, in operating, complete a circuit for relay 217 over a path extending from grounded battery, winding and right-hand normal contacts of relay 217, segment 324, brush 314 of distributor D, contacts 393 of relay 330, contacts 394 of relay 331, back contact and inner left-hand armature of relay 332, front contact and left-hand armature of relay 333 and back contact and armature of relay 339 to ground. Relay 217, in operating, locks up over a path extending from grounded battery, winding and right-hand alternate contacts of relay 217 to ground at the contacts 289 of listening key LK. Relay 217, in operating, connects the interrupter IZ in circuit with the supervisory signal 299 and causes the flashing signal to be given to the operator, indicating to her that her attention is desired by the called subscriber at the distant exchange. The operator by actuating the listening key LK opens the circuit for relay 217 whereupon relay 217 releases and the flashing signal ceases.

To release the connection the operator releases the cord circuit keys K and A. Relays 209 and 211 thereupon release, causing in turn the release of relays 225, 214, and 107. Relay 107 in releasing completes a circuit for the energization of relay 105 over the following path: ground back contact and inner right-hand armature of relay 107, contact 141, brush 131 of switch F, right-hand armature and back contact of relay 106, left-hand normal contacts and winding of relay 105 to grounded battery. Relay 105 in operating locks up through its inner left-hand alternate contacts under control of relay 107. Under control of motor magnet 122, the brushes 130 to 135 inclusive of switch F are stepped to normal position.

Relay 214, in releasing, opens at its inner right-hand contacts the holding circuit for relay 218 and causes lamp 299 to be extinguished, and connects battery at its outer right-hand contacts through the winding of relay 224, and ground through its inner right-hand normal contacts to the contacts with which brush 255 of the switch F—2 is associated. Relay 224 then operates, thereby completing an interrupting circuit for magnet 203. Under the control of magnet 203, the brushes 250 to 255 inclusive of the switch F—2 are stepped to normal position.

When relay 225 releases, 900, 1100 and 1300 cycle current is impressed simultaneously upon the toll line through contacts of relay 226 and relay 220 for two cycles of the distributor D. The first cycle of the distributor D energizes relay 228, which locks up under control of relay 227. The second cycle of the distributor D energizes relay 227, which in operating releases relays 228 and 226.

These frequencies are picked up by the receiving circuit R—2 at the distant exchange, and cause the actuation of relays 536 to 538 inclusive, therein. These relays in operating cause the energization of relay 440 over a path extended from grounded battery, winding of relay 440, segment 523 and brush 513 of distributor D—2, back contact and left-hand armature of relay 535, front contact and left-hand armature of relay 536, front contact and inner armature of relay 537, left-hand armature and front contact of relay 538 to ground. Relay 440 in operating opens the holding circuit for cut-off relay 409 and relay 443, whereupon these relays release. Relay 443, in releasing, again completes the previously traced operating circuit of relay 444, which relay in operating completes an operating circuit for magnet 404. Under the control of stepping magnet 404, brushes 450 to 455 inclusive of the switch F—3 are moved to their normal positions.

Relay 443 in releasing also completes a circuit for operating release magnet 754 of switch SL over a path extending from grounded battery, winding of magnet 754, off normal contacts 755 and back contact and intermediate right-hand armature of relay 443 to ground. Magnet 754 in operating locks up through its own contacts and causes the restoration of switch SL to normal in the manner well known in the art. When the switch is restored to normal contacts 155 are opened and magnet 754 releases.

The succeeding switches of the train at exchange M including the selector switches SL—2, SL—3 and connector switch then release due to the removal of ground from the test terminal 732. When switch SL is released relays 804 and 801 of switch CS release and a circuit for release magnet 834 is then completed over a circuit extending from grounded battery, winding of magnet 834, off normal contacts 833, right-hand normal contacts of relay 802 and normal contacts of relay 804 to ground. Relay 802 released due to the removal of ground from test terminal 895 and due to the release of relay 801. Magnet 834 in operating restores the switch CS to normal.

In case the called line is busy, the ground present on the test contacts thereof when the side switch arm 830 is in its second position causes the operation of relay 804 which connects a source of busy tone 832 to the connector. The operator, upon not receiving a ringing signal within the usual period, actuates listening key LK to connect the receiver across the line and upon receiving a busy tone will disestablish the connection.

Let it next be assumed that the operator at the originating exchange desires connection with a local subscriber at the distant exchange N. For the purpose of simplicity it will also be assumed that the station of the subscriber at the exchange N has the same number as the station of the subscriber at exchange M, the connection to which has been previously described. Since exchange N can be connected with a toll line extending to exchange M, which is in the A group of toll lines, the operator at the originating exchange will again depress key K and group key A after which she may depress any one of the keys of the D set of keys, for example key 2, thereafter the key L and thereafter keys corresponding to the number desired at the exchange N.

The operation of the system up until the time that the sender S starts to deliver impulses is identical with that heretofore described in connection with the building up of a connection to the station at exchange M. In the present instance, however, when magnet 101 starts operating, 900 cycle current connected to key 2 of the D set of keys will be projected over the trunk circuit as brushes 155 and 156 pass over their respective contacts 170 and 181 and will be received by the receiving circuit R—3 causing the operation of relay 591 therein, which relay in operating causes two impulses to be delivered to the impulse relay 700 of the switch SL, whereupon the brushes 720 to 724 inclusive of the switch SL will be moved two steps in a primary direction.

In the manner heretofore described the brushes will then be moved in their secondary direction or hunting direction until an idle toll line extending to the exchange N is reached, whereupon the side switch brushes of switch SL will be moved into their third positions. Assuming that the toll line T² which terminates in contacts 740 to 743 inclusive, is the one that has been selected, relay 775 will operate over a path extending from ground, winding of relay 775, brush 724 and terminal 743 of switch SL to ground. Relay 775 in operating prevents the succeeding impulses from affecting apparatus associated with the toll switching trunk TS and so arranges the circuit that the succeeding impulses, which are transmitted from the impulse sender S, will pass over the toll line T² to effect first, the receiving circuit thereat, similar to the receiving circuit R—2 shown in Fig. 5 of the drawing, to cause the operation of a line relay at exchange N, similar to the line relay 400 shown in Fig. 4 of the drawings at exchange M, and thereafter to effect a receiving circuit similar to the receiving circuit R—3 at the exchange M, shown in Fig. 5 of the drawings. The receiving circuit at exchange N (not shown), similar to the receiving circuit R—3 at exchange M, will then be operated to cause the actuation of selector switches SL'. SL2', SL3' and connector switch CS' at the exchange N in exactly the same manner as has been previously described in connection with the building up of a connection to the subscriber at the exchange N.

It will be noted that relay 775 in attracting its outer left-hand armature disconnects ground at the contacts of relay 447 from the armature of relay 771, in attracting its inner left-hand armature removes relay 771 from bridged relationship with the talking conductors of the toll switch trunk TS, in attracting its outer right-hand armature opens the operating circuit for relay 772, and in attracting its inner right-hand armature completes an obvious circuit for relay 448. Relay 448 in operating connects battery through its front contact and right-hand armature to contact 529 of the distributor D—2, and at its outer left-hand armature opens the circuit for relays 551 and 447. Relay 447 then releases thereby releasing relay 449. Relay 449 in retracting its outer left-hand armature disconnects battery from the contact 529 of the distributor D—2. It will be noted, however, that a substitute for this battery connection was supplied at the right-hand contacts of relay 448, when it operated. Relay 448 in attracting its inner left-hand armature connects ground through contact 570 and brush 560 of switch F—4 to the strapped contacts associated with brush 660 of switch S—6, whereupon magnet 670 of switch S—6 operates to step the brushes 640, 650 and 660 into engagement with their sixth set of contacts, whereupon another interrupting circuit for magnet 670 is completed through the strapped contacts associated with the brush 650. Under the control of magnet 670 the brushes 640, 650 and 660 of switch S—6 are restored to normal position. Relay 551 in releasing completes an operating circuit previously traced for relay 552, which relay in operating completes an operating circuit for magnet 586. Under the control of magnet 586 the brushes 560 to 565 inclusive of switch F—4 are stepped to their normal position.

It will thus be seen that due to the actuation of key 2 of the D set of keys, the switch SL at the distant exchange M has been actuated to select a through toll line leading to the succeeding distant exchange N and that additional impulses from the sender S will not affect the receiving circuit at exchange M but will pass over the toll line T² which is inductively connected by the repeating coils 762 and 962 to the trunk TS' at the exchange N.

Under control of motor magnet 101, the brushes of switch SW are stepped into engagement with their eighth set of contacts, or in other words, with the set of contacts to which the key L is connected and since it has been assumed a local subscriber in exchange N is desired, 700 cycle current will be projected over the toll line and will be received by a receiving circuit (not shown) at exchange N similar to the receiving circuit R—2 at exchange M, shown in Fig. 5 of the drawing. In a manner identical to that previously described a line relay at exchange N will be actuated similar to the line relay 400 at exchange M, shown in Fig. 4 of the drawings. This line relay at exchange N in operating will cause an idle switching trunk TS', similar to the switching trunk TS shown in Fig. 4 of the drawings, to be associated with the incoming end of the toll line T2 and a switch (not shown), similar to the switch F—4 at exchange M shown in Fig. 5 of the drawings, will be actuated to associate a receiving circuit (not shown) similar to the receiving circuit R—3 at exchange M shown in Fig. 5 of the drawings.

Following this impulse, impulses corresponding to the depressed keys will be projected over the toll line to select a desired local subscriber at exchange N causing switches SL2', SL3' and connector switch CS' at exchange N to be actuated to extend the line to the line of the desired subscriber.

The actuation of the supervisory signal at the operator's position at the originating exchange informs her that the ringing signal may be inaugurated and the various supervisory signals are actuated in a manner similar to that previously described. It is believed that such operation will be clearly evident from the foregoing description.

The operator at the originating exchange noting the disconnect signal 299 will release the connection in the manner heretofore described by restoring key K and key A to normal position. When the 900, 1100 and 1300 cycle curent is impressed upon the toll line at the originating exchange it will cause the actuation of relays (not shown) associated with the receiving circuit (not shown) at exchange N similar to the relays 536 to 538 inclusive associated with the receiving circuit R—2 shown in Fig. 5 of the drawings at exchange M in a manner similar to that previously described. These relays in operating will cause a release relay at the exchange N, (not shown) similar to the release relay 440 at the exchange M, to be actuated causing thereby in a manner similar to that previously described the successive release of switches SL2', SL3' and CS' at exchange N. The release frequencies are also picked by the receiving circuit R—2 at exchange M and cause the release of selector switch SL in the manner heretofore described.

It is to be understood that the invention is not limited to the utilization of the frequency currents herein chosen to describe the invention. It will be apparent however that by utilizing voice frequency currents and various combinations thereof, the toll lines can be also used for Morse operation and that there will then be no danger of the frequencies interfering with the Morse signals.

The toll line circuits are of the two way type i. e., calls may be extended either to or from either of the exchanges. To simplify the descriptive matter the operations involved in describing a call from the exchange M to the exchange O have been omitted. Referring to Fig. 2 of the drawings, it will be noted that a rectangle DN has been shown. Included within this rectangle will be apparatus and circuits as shown in Figs. 4 to 8 inclusive of the drawing. Included within the rectangle DM there will be apparatus and circuit as shown in Figs. 1, 1^A, 2 and 3 of the drawings. To those skilled in the art it will be readily apparent how a call may be extended in either direction over a toll line circuit.

What is claimed is:

1. A telephone exchange system comprising a first exchange, a second exchange, a toll line extending between said exchanges, an automatic switch, sources of current of different frequencies, means for applying a plurality of said sources to said line simultaneously and in different combinations, and means responsive to said combinations of frequencies to selectively set said switch.

2. A telephone exchange system comprising a first exchange, a second exchange, a toll line extending between said exchanges, an automatic switch, sources of current of different frequencies, means for variably applying a plurality of said sources to said line simultaneously, means for filtering, rectifying and translating the multi-frequency currents into direct current impulses and means responsive to such direct current impulses to selectively set said switch.

3. A telephone exchange system comprising a first exchange, a second exchange, a toll line extending between said exchanges, an automatic switch, sources of current of different frequencies, means for variably and simultaneously applying a plurality of said sources to said line at said first exchange, a receiving circuit at said second exchange comprising means for filtering, rectifying and translating the multi-frequency currents into impulses characteristic of the combinations of currents impressed upon the line at the first exchange, and means to selectively set said automatic switch by said direct current impulses.

4. In a telephone exchange system, a first exchange, a second exchange, a toll line extending between said exchanges, a train of automatic switches, sources of current of different frequencies, means for variably applying combinations of said frequencies to said line simultaneously, and means responsive to the successive application of said combinations to said line to successively set said switches.

5. In a telephone exchange system, a first exchange, a second exchange, a third exchange, a toll line extending between said first and said second exchanges, a toll line extending between said second and said third exchanges, a called station at said third exchange, automatic switches, sources of current of different frequencies, means for applying simultaneously a plurality of said sources to the outgoing end of said toll line at said first exchange and means responsive to the applied currents for setting said switches upon the terminals of the called station.

6. In a telephone exchange system, a calling station, a called station, a toll line circuit, sources of current of different frequencies, means including automatic switches and said toll line circuit for interconnecting said calling and called stations, means for signaling said called station, and means for controlling the setting of said switches and the actuation of said signaling means by applying simultaneously a plurality of said frequencies to said line.

7. In a telephone exchange system, a first exchange, a second exchange, an operator's position at said first exchange, a called station at said second exchange, a plurality of toll lines extending between said exchanges, automatic switching mechanism at said second exchange accessible to said toll lines for extending connections from said toll lines to said called station, an impulse receiving mechanism at said second exchange common to said toll lines, means for associating said receiving mechanism with any one of said toll lines, and an impulse transmitting means at said first exchange for transmitting impulses consisting of a plurality of frequencies simultaneously applied in different combinations to said receiving mechanism for setting said switching mechanism.

8. In a telephone exchange system, a first exchange, a second exchange, a plurality of toll lines extending between said exchanges, an operator's position at said first exchange, an automatic switch at said second exchange accessible to said toll lines, means at said first exchange for automatically seizing an idle toll line, a plurality of sources of currents of relatively high frequency at said first exchange, a set of digit keys at said first exchange for applying simultaneously a plurality of said frequencies in different combinations to said toll line, and means at said second exchange operated in response to said plurality of frequencies for actuating said automatic switch.

9. In a telephone exchange system, a first exchange, a second exchange, a third exchange, an operator's position at said first exchange, a called station at said third exchange, automatic switches at each of said exchanges, means under the control of the operator for automatically building up a talking connection from her position to the called station at said third exchange, releasing means for each of said switches, a plurality of sources of relatively high frequency currents, and means for actuating said releasing means by applying a plurality of said sources of frequencies to said talking connection.

10. In a telephone exchange system, a first exchange, a plurality of toll lines extending from an operator's position at said first exchange, an automatic switch at said second exchange accessible to said toll lines, means at said first exchange for seizing an idle toll line, a plurality of sources of current of relatively high frequency at said first exchange, and means at said second exchange for filtering, rectifying and converting the relatively high frequencies transmitted, into a number of impulses of direct current corresponding as to number, to the digit represented by the depressed digit key.

11. In a telephone exchange system, a first exchange, a plurality of sources of current of relatively high frequency, a plurality of sets of digit keys thereat for applying different combinations of said sources of current depending upon the key depressed, a second exchange, an idle toll line extending between said exchanges, a plurality of trunk circuits terminating in selector switches at said second exchange, means for connecting said idle toll line with an idle one of said trunk circuits, an impulse receiving mechanism at said second exchange comprising means for filtering, rectifying and translating the relatively high frequency currents into direct current impulses corresponding in number, to the digit represented by the depressed digit key for selectively controlling said selector switches, local trunks and through trunks accessible to said selector switches, and means for disconnecting said impulse receiving mechanism if said selector switch is set upon the terminals of one of said through trunk circuits.

12. In a telephone exchange system, a first exchange, a second exchange, a line extending between said exchanges, means including said line and automatic switches for connecting stations of said exchanges, a plurality of sources of voice frequency currents, and means for successively applying sets of different combinations of said sources to said line for controlling the actuation of said switches.

13. In a telephone exchange system, a first exchange, a second exchange, a line extending between said exchanges, means including said line and automatic switches for connecting stations of said exchanges, said automatic switches having primary and secondary directional movements, a plurality of sources of current with different frequencies, and means for applying different combinations of said sources to said line for controlling the directional movements of said switches.

14. In a telephone exchange system, a first exchange, an operator's position thereat, a second exchange and a third exchange, a called station at said third exchange, means including automatic switches at each of said exchanges for establishing a talking connection between said operator's position and said called station, means responsive to the restoration of the receiver to the switchhook at the called station for signaling the operator, a plurality of sources of relatively high frequency currents at said originating exchange, a release magnet for each of the switches at each exchange, and operator controlled means for simultaneously applying a plurality of said relatively high frequency currents to the established connection for causing the actuation of said release magnets.

15. In a telephone exchange system, an originating exchange, a distant exchange, a plurality of two way toll lines extending between said exchanges, automatic switching mechanism at each of said exchanges, and means at each exchange for automatically seizing on an idle toll line and for thereafter transmitting impulses, each impulse consisting of a plurality of different frequencies simultaneously applied to the toll line for controlling the switching mechanism at the distant exchange.

16. The method of extending a connection to a called station and of supervising the connection thereto which comprises the simultaneous transmission and the simultaneous receiving of current impulses of different frequencies in different predetermined combinations and translating said combinations into corresponding switching movements and supervisory functions.

17. The method of extending a connection to a numbered called station which comprises simultaneously transmitting a plurality of current impulses of different frequencies for each digit, varying the combinations for the digits of the called number, selectively receiving the impulses and translating such combinations into corresponding movements for the extension of connections.

18. The method which comprises simultaneously transmitting equal numbers of current impulses to form combinations, simultaneously receiving the impulses of each combination translating said combinations into sets of current impulses varying in number and causing switching movements to take place corresponding to each combination.

19. In a telephone exchange system, an exchange, an operator's position thereat, a called station, an automatic switch at said exchange, means under the control of the operator for automatically building up a talking connection from her position to the called station, releasing means for said switch, a plurality of sources of relatively high frequency currents, and means for actuating said releasing means by applying a plurality of said sources to said talking connection.

20. In a telephone system, a calling station, a plurality of called stations designated by varying numbers of digits, a plurality of sets of transmitters at said calling station, said transmitters adapted to transmit impulses of current of different frequencies in different combinations and the number of said sets corresponding to or exceeding the greatest number of digits comprising any one of said called station designations and automatic switching mechanism responsive to the operation of transmitters in a lesser number of sets to selectively interconnect said calling and one of said called stations.

21. In a telephone exchange system, first, second and third exchanges, a line extending from said first to said second exchange, a line extending from said second to said third exchange, a trunk circuit terminating at said second exchange, a called station at said third exchange, automatic switches at said second and third exchanges, sources of current of different frequencies, means for simultaneously connecting combinations of said sources to said toll line extending from said first to said second exchange for selectively setting said automatic switch at said second exchange upon the terminals of said trunk circuit or upon the terminals of said toll line extending from said second to said third exchange to set said automatic switch at said third exchange upon the terminals of said called station.

In witness whereof, we hereunto subscribe our names this 29th day of December A. D., 1920.

RAY S. WILBUR.
CHARLES WHITE.